US012572204B1

(12) United States Patent
Ye

(10) Patent No.: US 12,572,204 B1
(45) Date of Patent: Mar. 10, 2026

(54) SWITCHING TRACKING MODES IN MOTION CONTROL

(71) Applicant: Sony Interactive Entertainment Inc., Tokyo (JP)

(72) Inventor: Xiaoyong Ye, South San Francisco, CA (US)

(73) Assignee: SONY INTERACTIVE ENTERTAINMENT INC. (JP)

( * ) Notice: Subject to any disclaimer, the term of this patent is extended or adjusted under 35 U.S.C. 154(b) by 0 days.

(21) Appl. No.: 18/983,997

(22) Filed: Dec. 17, 2024

(51) Int. Cl.
*G06F 3/01* (2006.01)
(52) U.S. Cl.
CPC ..................................... *G06F 3/013* (2013.01)
(58) Field of Classification Search
CPC ....................................................... G06F 3/013
See application file for complete search history.

(56) References Cited

U.S. PATENT DOCUMENTS

| | | | |
|---|---|---|---|
| 6,637,883 | B1 | 10/2003 | Tengshe et al. |
| 7,783,061 | B2 | 8/2010 | Zalewski et al. |
| 7,809,145 | B2 | 10/2010 | Mao |
| 8,437,513 | B1 | 5/2013 | Derakhshani et al. |
| 8,793,620 | B2 | 7/2014 | Stafford |
| 8,824,779 | B1 | 9/2014 | Smyth |
| 8,854,298 | B2 | 10/2014 | Osman et al. |
| 8,907,891 | B2 | 12/2014 | Zhu et al. |
| 8,947,347 | B2 | 2/2015 | Mao et al. |
| 9,030,425 | B2 | 5/2015 | Stafford |
| 9,044,675 | B2 | 6/2015 | Stafford et al. |

| | | | |
|---|---|---|---|
| 9,084,938 | B2 | 7/2015 | Osman et al. |
| 9,094,636 | B1 | 7/2015 | Sanders et al. |
| 9,116,545 | B1 | 8/2015 | Raffle et al. |
| 9,183,683 | B2 | 11/2015 | Osman et al. |
| 9,373,320 | B1 | 6/2016 | Lyon et al. |
| 9,665,171 | B1 * | 5/2017 | Skogö ..................... G06F 3/013 |
| 9,773,372 | B2 | 9/2017 | Froy et al. |
| 9,836,816 | B2 | 12/2017 | Cerny |
| 9,857,871 | B2 * | 1/2018 | Mallinson ............. G06F 1/3231 |
| 9,922,253 | B2 | 3/2018 | Asbun et al. |
| 10,032,457 | B1 | 7/2018 | Liu et al. |
| 10,169,846 | B2 | 1/2019 | Stafford et al. |
| 10,192,528 | B2 | 1/2019 | Young et al. |
| 10,372,205 | B2 | 8/2019 | Young et al. |
| 10,401,952 | B2 | 9/2019 | Young et al. |
| 10,859,830 | B2 | 12/2020 | Norden |

(Continued)

OTHER PUBLICATIONS

"Lossy compression." (Mar. 25, 2016). Retrieved from https://en.wikipedia.org/w/index.php?title=Lossy_compression&oldid=71892088.

(Continued)

*Primary Examiner* — Mihir K Rayan

(74) *Attorney, Agent, or Firm* — Kilpatrick Townsend & Stockton LLP

(57) ABSTRACT

A method, system, and computer readable medium for switching between motion tracking mode. The method includes detecting a significant change in confidence level for motion tracking. A change from a first tracking mode to a second tracking mode is initiated when a significant change in confidence level is detected and the change is paused until a saccade or blink is detected. by eye tracking device. After a saccade or blink is detected the tracking mode switches from the first tracking mode to the second tracking mode.

22 Claims, 12 Drawing Sheets

(56) References Cited

U.S. PATENT DOCUMENTS

| | | | |
|---|---|---|---|
| 11,163,358 | B2 | 11/2021 | Marks et al. |
| 11,181,990 | B2 | 11/2021 | Marks et al. |
| 11,381,888 | B2 | 7/2022 | Krishnamurthy |
| 11,501,102 | B2 | 11/2022 | Salamon et al. |
| 11,615,312 | B2 | 3/2023 | Krishnamurthy |
| 12,019,795 | B2 | 6/2024 | Osman et al. |
| 12,145,060 | B2 | 11/2024 | Dorn et al. |
| 2003/0038818 | A1 | 2/2003 | Tidwell |
| 2003/0194142 | A1 | 10/2003 | Kortum et al. |
| 2004/0207632 | A1 | 10/2004 | Miller et al. |
| 2006/0239471 | A1 | 10/2006 | Mao et al. |
| 2007/0156391 | A1 | 7/2007 | Guenthner et al. |
| 2007/0171367 | A1 | 7/2007 | Sebastian et al. |
| 2007/0198982 | A1 | 8/2007 | Bolan et al. |
| 2007/0271560 | A1 | 11/2007 | Wahlert et al. |
| 2008/0188777 | A1 | 8/2008 | Bedziouk et al. |
| 2009/0289895 | A1 | 11/2009 | Nakada et al. |
| 2010/0056274 | A1 | 3/2010 | Uusitalo et al. |
| 2011/0085700 | A1 | 4/2011 | Lee |
| 2011/0298829 | A1 | 12/2011 | Stafford et al. |
| 2012/0033132 | A1 | 2/2012 | Chen et al. |
| 2012/0033673 | A1 | 2/2012 | Goel |
| 2012/0035934 | A1 | 2/2012 | Cunningham |
| 2012/0052954 | A1 | 3/2012 | Zhu et al. |
| 2012/0068913 | A1 | 3/2012 | Bar-Zeev et al. |
| 2012/0075062 | A1 | 3/2012 | Osman et al. |
| 2012/0086630 | A1 | 4/2012 | Zhu et al. |
| 2012/0086631 | A1 | 4/2012 | Osman et al. |
| 2012/0122592 | A1 | 5/2012 | Stafford et al. |
| 2012/0154277 | A1 | 6/2012 | Bar-Zeev et al. |
| 2012/0256967 | A1 | 10/2012 | Baldwin et al. |
| 2012/0272179 | A1 | 10/2012 | Stafford |
| 2012/0276998 | A1 | 11/2012 | Zhu et al. |
| 2012/0300061 | A1 | 11/2012 | Osman et al. |
| 2013/0050432 | A1 | 2/2013 | Perez et al. |
| 2013/0127980 | A1 | 5/2013 | Haddick et al. |
| 2013/0135196 | A1 | 5/2013 | Park et al. |
| 2013/0257751 | A1 | 10/2013 | Stafford |
| 2013/0267317 | A1 | 10/2013 | Aoki et al. |
| 2013/0279724 | A1 | 10/2013 | Stafford et al. |
| 2014/0007097 | A1 | 1/2014 | Chin et al. |
| 2014/0013437 | A1 | 1/2014 | Anderson et al. |
| 2014/0043227 | A1 | 2/2014 | Skogöet al. |
| 2014/0092006 | A1 | 4/2014 | Boelter et al. |
| 2014/0096002 | A1 | 4/2014 | Dey et al. |
| 2014/0178043 | A1 | 6/2014 | Kritt et al. |
| 2014/0247277 | A1 | 9/2014 | Guenter et al. |
| 2014/0292665 | A1 | 10/2014 | Lathrop et al. |
| 2014/0300538 | A1 | 10/2014 | Rijnders |
| 2014/0310256 | A1 | 10/2014 | Olsson et al. |
| 2014/0313120 | A1 | 10/2014 | Kamhi |
| 2014/0313198 | A1 | 10/2014 | Keller et al. |
| 2014/0333535 | A1 | 11/2014 | Stafford |
| 2014/0347265 | A1 | 11/2014 | Aimone et al. |
| 2014/0354539 | A1 | 12/2014 | Skogöet al. |
| 2014/0361971 | A1 | 12/2014 | Sala |
| 2014/0361976 | A1 | 12/2014 | Osman et al. |
| 2014/0361977 | A1 | 12/2014 | Stafford et al. |
| 2014/0362110 | A1 | 12/2014 | Stafford |
| 2015/0015486 | A1 | 1/2015 | Osman et al. |
| 2015/0085097 | A1 | 3/2015 | Larsen |
| 2015/0085250 | A1 | 3/2015 | Larsen |
| 2015/0085251 | A1 | 3/2015 | Larsen |
| 2015/0094142 | A1 | 4/2015 | Stafford |
| 2015/0169053 | A1 | 6/2015 | Bozarth et al. |
| 2015/0192776 | A1 | 7/2015 | Lee et al. |
| 2015/0213634 | A1 | 7/2015 | Karmarkar et al. |
| 2015/0241967 | A1 | 8/2015 | Saripalle et al. |
| 2015/0254905 | A1 | 9/2015 | Ramsby et al. |
| 2015/0258431 | A1 | 9/2015 | Stafford et al. |
| 2015/0258432 | A1 | 9/2015 | Stafford et al. |
| 2015/0338915 | A1 | 11/2015 | Publicover et al. |
| 2016/0025971 | A1 | 1/2016 | Crow et al. |
| 2016/0054837 | A1 | 2/2016 | Stafford |
| 2016/0085302 | A1 | 3/2016 | Publicover et al. |
| 2016/0091720 | A1 | 3/2016 | Stafford et al. |
| 2016/0093105 | A1 | 3/2016 | Rimon et al. |
| 2016/0116745 | A1 | 4/2016 | Osterhout et al. |
| 2016/0210173 | A1 | 7/2016 | Bookman et al. |
| 2016/0212538 | A1 | 7/2016 | Fullam et al. |
| 2016/0235323 | A1 | 8/2016 | Tadi et al. |
| 2016/0246652 | A1 | 8/2016 | Herdrich et al. |
| 2016/0283455 | A1 | 9/2016 | Mardanbegi et al. |
| 2016/0307297 | A1 | 10/2016 | Akenine-Moller et al. |
| 2017/0123487 | A1 | 5/2017 | Hazra et al. |
| 2017/0123489 | A1 | 5/2017 | Guenter |
| 2017/0124760 | A1 | 5/2017 | Murakawa et al. |
| 2017/0178408 | A1 | 6/2017 | Bavor, Jr. et al. |
| 2017/0200252 | A1 | 7/2017 | Nguyen et al. |
| 2017/0200308 | A1 | 7/2017 | Nguyen et al. |
| 2017/0255259 | A1 | 9/2017 | Mor |
| 2017/0285735 | A1* | 10/2017 | Young .................... G06F 3/013 |
| 2017/0285736 | A1* | 10/2017 | Young .................... G06F 3/147 |
| 2017/0287446 | A1 | 10/2017 | Young et al. |
| 2018/0232451 | A1 | 8/2018 | Lev-Tov et al. |
| 2018/0275753 | A1 | 9/2018 | Publicover et al. |
| 2018/0299953 | A1* | 10/2018 | Selker .................. G06T 19/006 |
| 2019/0035431 | A1 | 1/2019 | Attorre et al. |
| 2019/0126821 | A1 | 5/2019 | Ho et al. |
| 2019/0156794 | A1 | 5/2019 | Young et al. |
| 2019/0289372 | A1 | 9/2019 | Merler et al. |
| 2019/0346922 | A1 | 11/2019 | Young et al. |
| 2019/0361526 | A1 | 11/2019 | Young et al. |
| 2019/0384381 | A1 | 12/2019 | Stafford et al. |
| 2020/0104319 | A1 | 4/2020 | Jati et al. |
| 2020/0160889 | A1 | 5/2020 | Puri et al. |
| 2020/0242507 | A1 | 7/2020 | Gan et al. |
| 2020/0301506 | A1 | 9/2020 | Young et al. |
| 2020/0322377 | A1 | 10/2020 | Lakhdhar et al. |
| 2020/0349921 | A1 | 11/2020 | Jansen et al. |
| 2021/0035599 | A1 | 2/2021 | Zhang et al. |
| 2021/0109590 | A1* | 4/2021 | Gullicksen ................ G06T 7/73 |
| 2022/0124242 | A1* | 4/2022 | Gruhlke .................... G06T 7/74 |
| 2022/0197381 | A1 | 6/2022 | Young et al. |
| 2022/0221932 | A1 | 7/2022 | Bathiche et al. |
| 2023/0071037 | A1 | 3/2023 | Kim et al. |
| 2024/0111361 | A1 | 4/2024 | Tibbling et al. |

OTHER PUBLICATIONS

"what is text complexity?" Available at: https://assets.pearsonschool.com/asset_mgr/current/201217/Text_Complexity_G1.pdf Accessed Sep. 26, 2023.

"3D Face Pose Estimation from a Monocular Camera" by Qiang Ji and Ruong Hu in Image and Vision Computing, vol. 20, Issue 7, Feb. 20, 2002, pp. 499-511.

"An Algorithm for Real-time Stereo Vision Implementation of Head Pose and Gaze Direction Measurement", by Yoshio Matsumoto and Alexander Zelinsky in FG '00 Proceedings of the Fourth IEEE International Conference on Automatic Face and Gesture Recognition, 2000, pp. 499-505.

"Facial feature extraction and pose determination", by Athanasios Nikolaidis Pattern Recognition, vol. 33 (Jul. 7, 2000) pp. 1783-1791.

"Head Pose Estimation in Computer Vision: A Survey" by Erik Murphy, in IEEE Transactions on Pattern Analysis and Machine Intelligence, vol. 31, No. 4, Apr. 2009, pp. 607-626.

B. Kang, Y. Kim and D. Kim, "Deep Convolutional Neural Network Using Triplets of Faces, Deep Ensemble, and Score-Level Fusion for Face Recognition," 2017 IEEE Conference on Computer Vision and Pattern Recognition Workshops (CVPRW), Honolulu, HI, 2017, pp. 611-618.

Bahill, A. Terry, and Jeffrey S. Kallman. "Predicting Final Eye Position Halfway Through a Saccade." IEEE Transactions on Biomedical Engineering BME-30.12 (1983): 781-86. Web.

Böhme, Martin, Michael Dorr, Christopher Krause, Thomas Martinetz, and Erhardt Barth. "Eye Movement Predictions Enhanced Bysaccade Detection" Brain Inspired Cognitive Systems: Aug. 29-Sep. 1, 2004. Web.

Co-Pending U.S. Appl. No. 18/591,424, to Steven Osman, filed Feb. 29, 2024.

(56)            References Cited

OTHER PUBLICATIONS

Di Hu et al., "Deep Multimodal Clustering for Unsupervised Audiovisual Learning", arXiv:1807.03094v3 [cs. CV] Apr. 19, 2019.

Donghuo Zeng et al. "Deep Triplet Neural Networks with Cluster-CCA for Audio-Visual Cross-modal Retrieval" Arxiv.org, Cornell University Library, Dated Aug. 10, 2019, XP081459707.

Elad Hoffer and Nir Ailo, "Deep Metric Learning Using Triplet Network", In: Feragen A., Pelillo M., Loog M. (eds) Similarity-Based Pattern Recognition. SIMBAD 2015. Lecture Notes in Computer Science, vol. 9370. Springer, Cham, Nov. 25, 2015.

Extend European Search for European Application No. 21787592.1, dated Mar. 27, 2024.

Final Office Action dated Jul. 25, 2017 for U.S. Appl. No. 15/087,629.

Final Office Action for U.S. Appl. No. 15/086,953, dated Jan. 4, 2019.

Final Office Action for U.S. Appl. No. 15/086,953, dated Mar. 15, 2018.

Final Office Action for U.S. Appl. No. 15/087,471, dated May 1, 2018.

Final Office Action for U.S. Appl. No. 15/087,629, dated Apr. 5, 2018.

Final Office Action for U.S. Appl. No. 16/523,791, dated Jan. 30, 2020.

Final Office Action for U.S. Appl. No. 16/848,484, dated Nov. 18, 2022.

Final Office Action for U.S. Appl. No. 16/848,512, dated Jul. 27, 2021.

Han, P., D. R. Saunders, R. L. Woods, and G. Luo. "Trajectory prediction of saccadic eye movements using a compressed exponential model." Journal of Vision 13.8 (2013): 27. Web.

Hao, Zhu et al. "Deep Audio-Visual Learning: A Survey," Arxiv.org, Cornell University Library, dated: Jan. 14, 2020, XP081578387.

Hochreiter & Schmidhuber. "Long Short-term memory." Neural Computation 9(8):1735-1780 (1997).

Hung Sungeun et al. "CBVMR: Content-Based Video-Music Retrieval Using Soft Intramodal Structure Constraint," Proceedings of the 2018 ACM on International Conference on Multimedia, Retrieved Jun. 5, 2018, pp. 353-361, XP05590838, ISBN: 978-1-4503-5046, Available at: http://arxiv.org/pdf/1704.06761.pdf.

International Search Report and Written Opinion dated Jul. 15, 2021 for International Patent Application Number PCT/US2021/026550.

International Search Report and Written Opinion dated Jul. 15, 2021 for International Patent Application Number PCT/US2021/026553.

International Search Report and Written Opinion of the International Searching Authority for International Patent Application Number PCT/US2021/026554.

Japanese Office Action for Japanese Application No. 2022-562558, dated Mar. 14, 2024.

Japanese Office Action for Japanese Application No. 2022-562558, dated Oct. 18, 2023.

Kyosuke Rinsaka, Yoshinobu Kajikawa, Yasuo Nomura, Study on Mutual Search System for Heterogeneous Media: Music Matching Images, Technical Report of the Institute of Electronics, Information and Communication Engineers, Japan, The Institute of Electronics, Information and Communication Engineers, Dec. 2002, vol. 102, No. 533, pp. 33-38.

Non-Final Office Action dated Feb. 23, 2017 for U.S. Appl. No. 15/087,629.

Non-Final Office Action dated Nov. 15, 2017 for U.S. Appl. No. 15/087,629.

Non-Final Office Action for U.S. Appl. No. 15/086,953, dated Aug. 29, 2018.

Non-Final Office Action for U.S. Appl. No. 15/087,471, dated Dec. 31, 2018.

Non-Final Office Action for U.S. Appl. No. 16/523,791, dated Sep. 19, 2019.

Non-Final Office Action for U.S. Appl. No. 16/533,659, dated Oct. 18, 2019.

Non-Final Office Action for U.S. Appl. No. 16/848,484, dated Jun. 24, 2022.

Non-Final Office Action for U.S. Appl. No. 16/848,499, dated Jun. 27, 2022.

Non-Final Office Action for U.S. Appl. No. 16/848,512, dated Mar. 15, 2021.

Non-Final Office Action for U.S. Appl. No. 17/691,656, dated Apr. 13, 2023.

Non-Final Office Action for U.S. Appl. No. 18/217,745, dated Sep. 30, 2024.

Non-Final Office Action for U.S. Appl. No. 18/591,424, dated Dec. 12, 2024.

Non-Final Office Action for U.S. Appl. No. 15/086,645, dated Oct. 11, 2017.

Non-Final Office Action for U.S. Appl. No. 15/086,953, dated Oct. 19, 2017.

Non-Final Office Action for U.S. Appl. No. 15/087,471, dated Oct. 10, 2017.

Non-Final Office Action for U.S. Appl. No. 15/087,629, dated Feb. 23, 2017.

Non-Final/Final Office Action for U.S. Appl. No. 16/235,727, dated Oct. 3, 2019.

Notice of Allowance for U.S. Appl. No. 15/086,645, dated Mar. 13, 2018.

Notice of Allowance for U.S. Appl. No. 15/086,953, dated Mar. 20, 2019.

Notice of Allowance for U.S. Appl. No. 15/087,471, dated Apr. 17, 2019.

Notice of Allowance for U.S. Appl. No. 15/087,629, dated Aug. 15, 2018.

Notice of Allowance for U.S. Appl. No. 15/523,791, dated May 14, 2020.

Notice of Allowance for U.S. Appl. No. 16/235,727, dated Apr. 6, 2020.

Notice of Allowance for U.S. Appl. No. 16/261,476, dated Feb. 26, 2020.

Notice of Allowance for U.S. Appl. No. 16/533,659, dated Jan. 29, 2020.

Notice of Allowance for U.S. Appl. No. 16/848,484, dated Feb. 17, 2023.

Notice of Allowance for U.S. Appl. No. 16/848,499, dated Nov. 21, 2022.

Notice of Allowance for U.S. Appl. No. 16/848,512, dated Mar. 2, 2022.

Notice of Allowance for U.S. Appl. No. 16/897,926, dated Jan. 27, 2021.

Notice of Allowance for U.S. Appl. No. 17/347,173, dated Nov. 19, 2021.

Notice of Allowance for U.S. Appl. No. 17/691,656, dated Jul. 28, 2023.

Notice of Allowance for U.S. Appl. No. 18/527,350, dated Jul. 19, 2024.

Pagel, Max. "Trajectory-based prediction of saccade landing Points", Bachelorarbeit am Institut fuer Neuro-und Bioinformatik Technisch Naturwissenschaftliche Fakultaet Universitaet zu Luebeck (2007).

Patent Cooperation Treaty; "International Search Report" issued in corresponding PCT Application No. PCT/US16/48736, dated Oct. 28, 2016, 2 pages.

Patent Cooperation Treaty; "Notification of Transmittal of the International Search Report and the Written Opinion of the International Searching Authority, or the Declaration" issued in corresponding PCT Application No. PCT/US16/48736, dated Oct. 28, 2016, 2 pages.

Patent Cooperation Treaty; "Written Opinion of the International Searching Authority" issued in corresponding PCT Application No. PCT/US16/48736, dated Oct. 28, 2016, 8 pages.

Pearson "What is Text Complexity?" Common Core 101, pp. 56-63 Dated Mar. 30, 2022.

Rayner et al. "How Psychological Science Informs the Teaching of Reading" American Psychological Society, Psych. Sci. in the Public Interest, vol. 2 No. 2 pp. 31-74.

Relja Arandjelovic and Andrew Zisserman, "Objects that Sound", arXiv:1712.06651v2 [cs.CV] Jul. 25, 2018.

(56)          References Cited

OTHER PUBLICATIONS

Second Notice of Allowance Dated Sep. 28, 2018 for U.S. Appl. No. 15/086,645.

Sereno et al. "Measuring Word Recognition in Reading: Eye Movements and Event-related Potentials" Trends in Cognitive Sci. vol. 7 No. 11 pp. 489-493, Nov. 2003.

Triesch, Jochen, Brian T. Sullivan, Mary M. Hayhoe, and Dana H. Ballard. "Saccade contingent updating in virtual reality." Proceedings of the symposium on Eye tracking research & applications-ETRA '02 (2002): n. pag. Web.

Wikipedia; "Eye tracking", https://en.wikipedia.org/wiki/Eye-tracking, printed on Feb. 26, 2016, pp. 1-8.

Wikipedia; "Optical flow", https://en.wikipedia.org/wiki/Optical-flow-sensor, printed on Feb. 26, 2016, pp. 1-4.

Wikipedia; "Saccade", https://en.wikipedia.org/wiki/Saccades, printed on Feb. 26, 2016, pp. 1-5.

Xiang et al., "Person Re-identification Based on Feature Fusion and Triplet Loss Function" 2018 24th International Conference on Pattern Recognition, Aug. 20-24, 2018, pp. 2477-2482 (Year:2018).

* cited by examiner

SLAM Tracked Visual Features/Landmarks Vs Time

SLAM Tracked Visual Features/Landmarks Vs Time

Reprojection Error Vs Time

SLAM Tracked Visual Features/Landmarks Vs Time
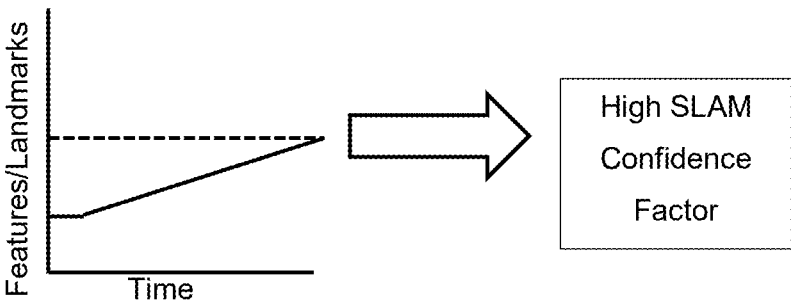
FIG. 4A
SLAM Tracked Visual Features/Landmarks Vs Time
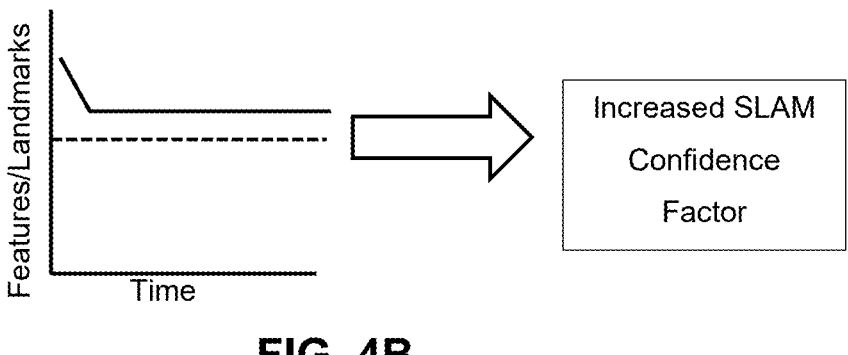
FIG. 4B
Reprojection Error Vs Time
FIG. 4C

1041 Initialize NN

1042 Provide NN with inputs/features having known labelings/classifications

1043 Predict labelings/classification with NN

1044 Compare predicted labelings/classifications with known labelings/classification

1045 Train and Optimize NN with Loss function

SWITCHING TRACKING MODES IN MOTION CONTROL

FIELD OF THE DISCLOSURE

Aspects of the present disclosure relate to motion tracking specifically aspects of the present disclosure relate to motion tracking with multiple tracking modalities.

BACKGROUND OF THE DISCLOSURE

Modern Virtual Reality (VR), Augmented Reality (AR) and robotics systems rely on accurate and fast motion tracking for user interaction with the device. These systems often rely on information relating to the location and orientation of the system itself (or a part of the system such as a controller) relative to other objects. Many implementations rely on a combination of inertial measurements taken by accelerometers or gyroscopes within the system and visual detection of the system and environment by an external camera to determine the location and orientation of the system.

Some of the earliest implementations used infrared lights detected by an infrared camera with a defined detection radius on a game controller pointed at a screen. The camera takes images at a moderately fast rate of 200 frames per second and the relative location of the infrared lights are determined. The distance between the infrared lights is predetermined and from the relative location of the infrared lights in the camera image a position of the controller relative to the screen can be calculated. Inertial measurement units (IMU) s are also used to provide information on relative three-dimensional change in position or orientation of the system or components of the system. IMUs are devices that measure and report one or more pieces of movement information such as specific force, angular rate, and sometimes the orientation. IMUs may use one or more accelerometers, gyroscopes, and magnetometers to generate this information. Notably IMUs are noisy and may be susceptible to drift. More modern camera based movement tracking may use simultaneous localization and mapping (SLAM) techniques to determine movement and orientation information. SLAM techniques generally use one or more cameras to construct or update a map of an unknown environment while simultaneously keeping track of an agent's location within it.

An issue with SLAM is that it is reliant on visual information which sometimes may be unreliable. For example, low light environments or rapid changes in brightness of the environment may result in loss of visual information thus causing temporary loss or unreliability of SLAM tracking information. Similarly, sometimes the camera may become occluded or a rapid change in direction may cause a temporary loss in SLAM tracking information. This loss or unreliability of tracking information may cause jarring movements when the system regains movement tracking information. Some systems supplement camera based tracking with IMU based tracking to improve accuracy, but even these systems can still have difficulty when the camera based tracking loses tracking information. Thus, it is within this context that aspects of the present disclosure arise.

BRIEF DESCRIPTION OF THE DRAWINGS

The teachings of the present disclosure can be readily understood by considering the following detailed description in conjunction with the accompanying drawings, in which:

FIG. 4A-4C are graphs showing confidence level determination factors indicating a potential increase in confidence level according to aspects of the present disclosure.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, examples of embodiments of the invention described below are set forth without any loss of generality to, and without imposing limitations upon, the claimed invention.

According to aspects of the present disclosure optical movement tracking systems may be augmented with an inertial movement tracking system to improve the resistance of the tracking system to tracking errors. Unlike other previously designed tracking systems, the system according to an aspect of the present disclosure is configured to switch between the optical tracking and inertial tracking when there is a significant change in the confidence level of optical tracking and avoids disturbing the user by delaying the switch until a saccade or blink by the user. The system may counteract drift in the IMU data by using optical tracking information to adjust a tracking window of the IMU tracking data when the confidence level in the optical tracking information is above a threshold. Additionally, aspects of the present disclosure may use one or more machine learning models to improve inertial tracking information and determine when to switch from optical tracking to inertial tracking.

Figure 1:
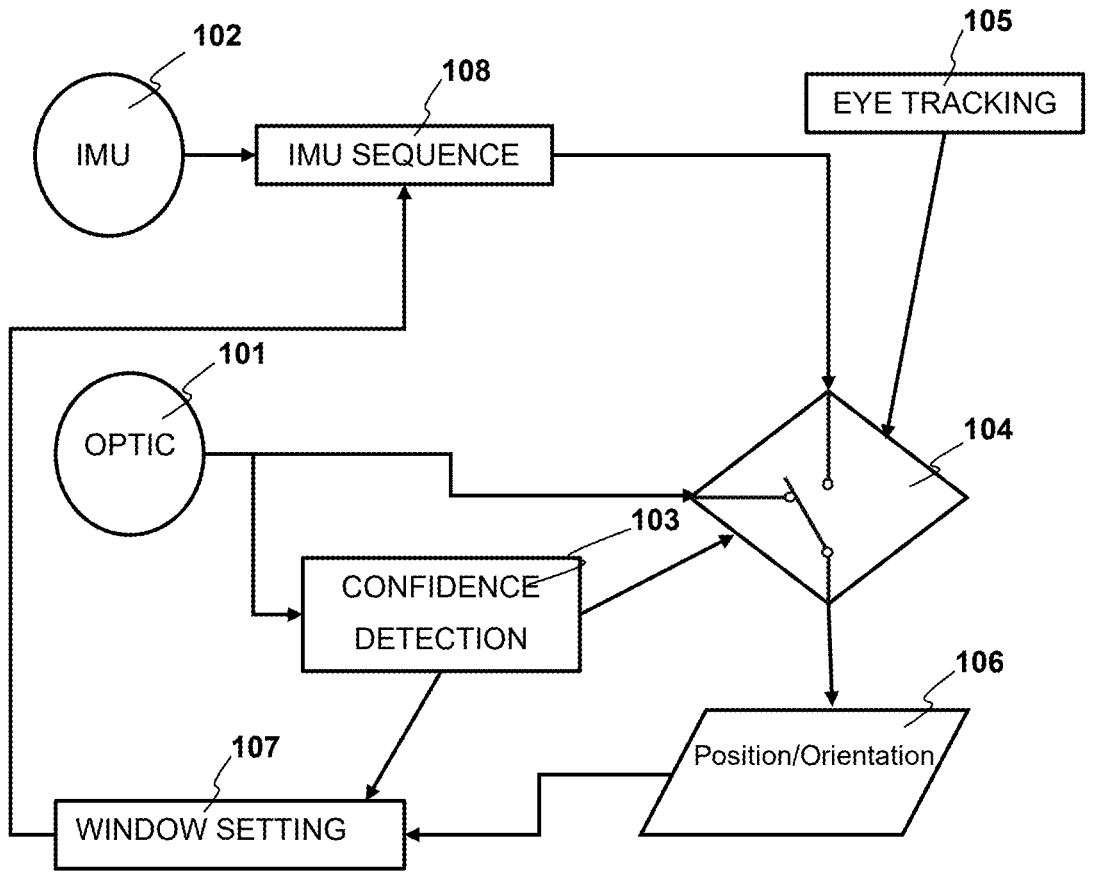
FIG. 1 is a flow diagram showing a method for switching between motion tracking modes according to aspects of the present disclosure.

FIG. 1 is a flow diagram showing a method for switching between motion tracking modes according to aspects of the present disclosure. As shown, the system may receive as inputs inertial tracking data 102 and optical tracking data 101. The optical tracking data 101 may be, for example and without limitation, SLAM tracking data and may include confidence factor information. Confidence factor information may include the reprojection error and/or number of tracked landmarks/features. The confidence factor information may be used to determine a confidence level 103 for the optical tracking data 101.

Figure 3A:
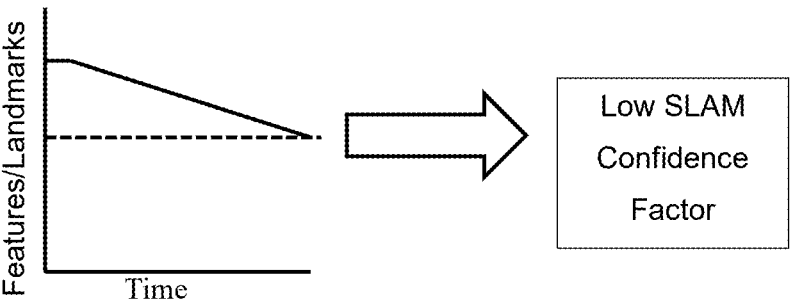
FIG. 3A-3C are graphs showing confidence level determination factors indicating a potential drop in confidence level according to aspects of the present disclosure.
Figure 3B:
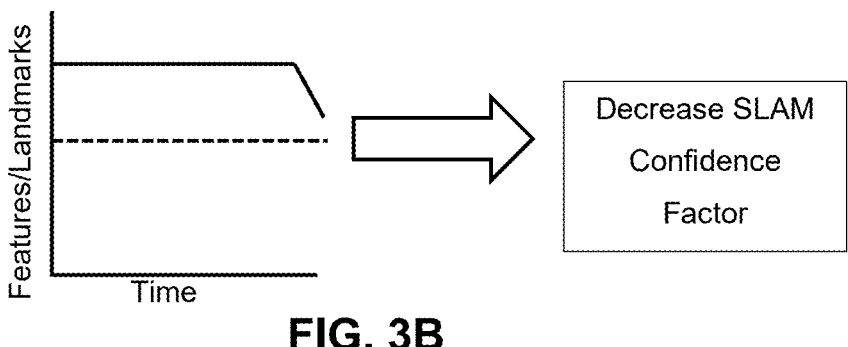

As shown in FIGS. 3A-3C and 4A-4C the confidence level may be determined by one or more confidence factors. In some implementations a single factor may determine a binary confidence level (either low or high). For example and without limitation, a factor such as tracked visual features or landmarks may be used to determine the binary confidence level. As shown in FIG. 3A the number of visual landmarks or features in the optical tracking system may be tracked over time. A threshold for the number of tracked visual landmarks or features may be established. This threshold may be an experimentally determined number of landmarks consistent with quality tracking. Thus, a number of tracked visual landmarks or features below the threshold indicates a low confidence level and thus the binary confidence level may drop from high to low when the number of tracked features or landmarks is below the threshold. Similarly, as shown in FIG. 4A, the number of tracked features or landmarks above the threshold may indicate that tracking quality is high and thus the binary confidence level may increase from low to high when the number of tracked features or landmarks rises above the threshold. Other factors that may determine a drop or rise in confidence level may include a derivative of the landmarks or features or the number of reprojection errors. As shown in FIG. 3B, a steep drop in the number of tracked landmarks or features may be a factor that indicates low confidence. This may be determined by a negative value for the derivative of the number of tracked landmarks of features. A threshold may be established for the derivative values that determines when a large negative value indicates reduced confidence in the optical tracking data. Thus, when a negative derivative value meets or exceeds the derivative threshold, a single factor binary confidence level may drop from high to low. On the other hand, as shown FIG. 4B sustained low derivative values for the number of tracked features or landmarks over time may indicate high quality tracking data when there are a sufficient number of tracked features and landmarks for tracking. Thus, in a single factor, binary confidence level, low derivative values after a large negative derivative value may establish a rise from low confidence to high confidence (as long as there are a sufficient number of tracked features or landmarks).

Figure 3C:
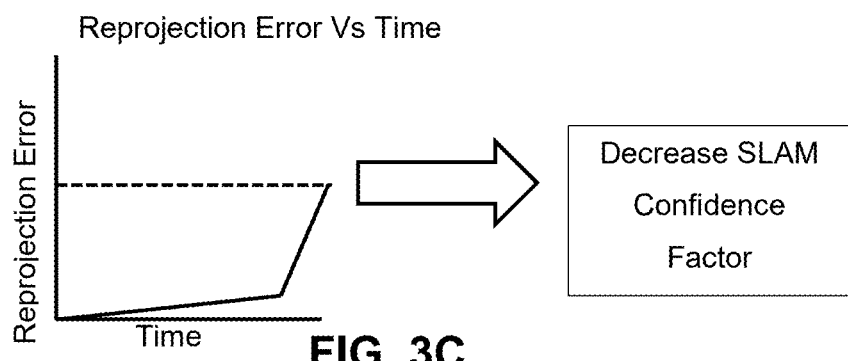

Another factor that may determine a significant change in the confidence level (e.g., a drop from high confidence to low confidence or vice versa) may be reprojection error as shown in FIGS. 3C and 4C. Reprojection error is generally used in mapping applications with optical tracking (such as SLAM) and refers to a geometric error corresponding to the image distance between a projected point and a measured one. It is used to quantify how closely an estimate of a 3D point recreates the point's true projection. Thus, a high reprojection error indicates an inaccurate recreation of the true environment and thus the optical tracking mode is unreliable. As such it may be used as a factor for determining the confidence level. A threshold reprojection error level may be decided, which may indicate that error levels above the threshold the mapping and optical tracking may be inaccurate. Thus when the reprojection error level is above the threshold a binary, single factor confidence level may drop from high confidence to low confidence. Similarly, as shown in FIG. 4C when the reprojection error returns to below the threshold confidence level may rise from low to high.

Additionally, in some implementations multiple factors may be used to determine the confidence level which may be either binary or continuous. For example and without limitation the confidence level may be determined by the reprojection error level (e.g., reprojection error level=1 when reprojection error is below a threshold and 0 when the reprojection error is above a threshold) and a derivative of the number of tracked features/landmarks (e.g., derivative error=0 when the derivative for number of tracked features/landmarks is below a threshold and 1 when the derivative values remains small.) when the number of tracked features and landmarks is above a threshold. One example equation for the confidence level may be:

$$\text{Confidence Level} =$$
$$\begin{cases} [\alpha(\text{reprojection error level}) + \beta(\text{derivative error})]/2 & \text{if tracked features} > \text{threshold} \\ 0 & \text{if tracked features} \le \text{threshold} \end{cases}$$

Where $\alpha$ is a weight for the reprojection error and $\beta$ is weight for the derivative error. Here a confidence level of less than 0.5 may be low confidence. It should be understood that the confidence level may be normalized between 0-1 by dividing the sum of factors by the input number of factors. Here two factors were used so the sum of the reprojection error and derivative error is divided by 2.

Referring back to FIG. 1, the confidence detection 103 may determine the confidence level which is used to determine whether to switch between a first tracking mode and a second tracking mode at 104. For example and without limitation, the first tracking mode may be optical tracking 101 and the second tracking mode may be inertial tracking 102. When there is a significant change in the confidence level, such as when the confidence level drops from low to high or vice versa the system initiates a switch from the current tracking mode to the next tracking mode, e.g., from the first tracking mode to the second tracking mode or from the second tracking mode to the first tracking mode. As shown, the switch 104 between tracking modes is not completed until eye tracking 105 indicates that the user is blinking or in a saccade. That is, once it is determined that the user is blinking or in a saccade the system may switch between tracking modes. The selected tracking mode may then be used to determine the position and/or orientation of the system 106.

Additionally, in some implementations the tracking data from a first mode and confidence level may be used to improve tracking for a second mode. For example, as shown in FIG. 1 the position/orientation data from the optical tracking mode may be used to improve inertial tracking. When the system switches 104 to optical tracking 101 because the confidence level 103 in optical tracking is high the system may use the position/orientation data 106 to set a window size 107 for the inertial tracking. The window size 107 may be used to determine the sequence length 108 for inertial tracking 102.

Figure 9:
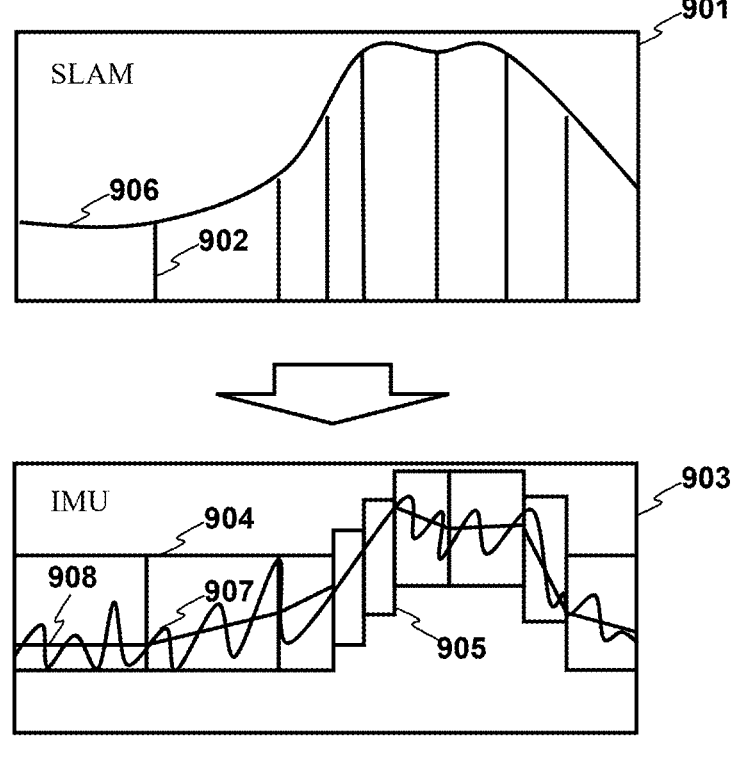
FIG. 9 depicts graphs depicting an example of window size determination for inertial tracking according to an aspect of the present disclosure.

An example of the determination of window size for inertial tracking is graphically shown in FIG. 9. Optical tracking data 901, such as SLAM tracking data, may include velocity data 906 depicted over time here as a line in the line graph. Periodically the velocity may be sampled 902 and these samples may be used to determine the measurement windows for the inertial tracking data. Here raw velocities 907 from the inertial tracking systems are graphed over time to show that raw velocities from inertial tracking are noisy and, with a fixed window size, this would lead to drift. To resolve this issue the windows in this implementation are varied in size to reduce the occurrence of drift. As shown, when the sampled velocity data 902 from optical tracking indicates a lower velocity, a wider window 904 may be used and as the sampled velocity from the optical data increases a smaller window 905 for the inertial data may be used. This ensures that the average inertial velocity 908 best fits with raw inertial data without too much drift.

Figure 2:
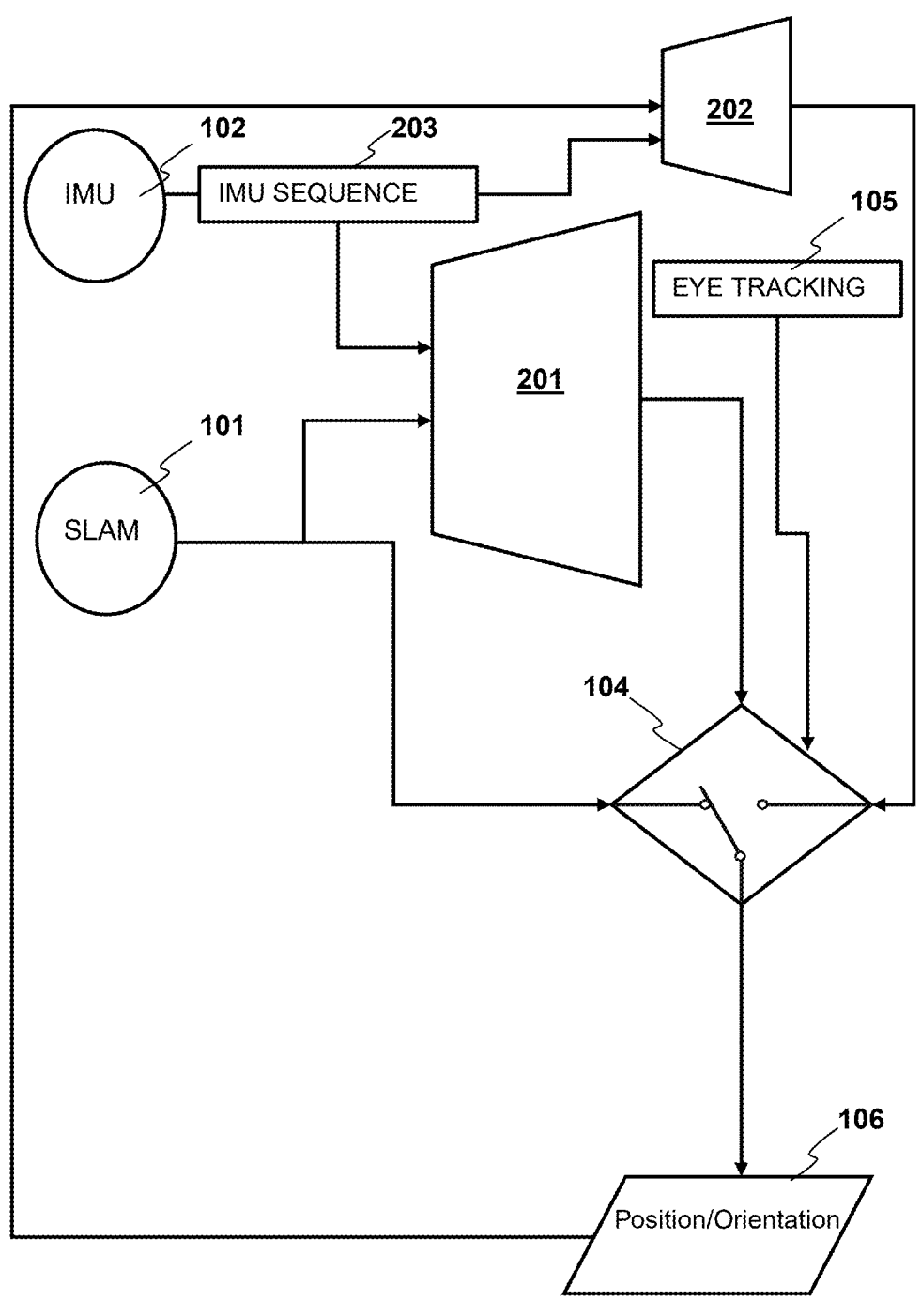
FIG. 2 depicts a flow diagram showing a method for switching between motion tracking modes using machine learning models according to aspects of the present disclosure.

FIG. 2 depicts a flow diagram showing a method for switching between motion tracking modes using machine learning models according to aspects of the present disclosure. Here the method is similar to the one depicted in FIG. 1 except that confidence level determination and window size determination have been replaced with separate machine learning models (e.g. neural networks either implemented as software or hardware). The Confidence level determination step here has been replaced by a machine learning model trained to determine the confidence level in the optical tracking data 201 from the optical tracking data 101 and inertial data 102. Similarly, the window size determination step is replaced with a machine learning model trained to determine position and orientation information from inertial tracking data. Like in FIG. 1 when there is a significant change in the confidence level as determined by the confidence level determination model, the system may initiate a change between tracking modes. Eye tracking data 105 is then used to determine when a saccade or blink is occurring. Once it is determined there is a blink or saccade the system completes the change between tracking modes effectively hiding any jitter or inconsistency between the two tracking modes behind the saccade or blink.

Eye Tracking

Eye gaze tracking has use in a wide range of applications, including medical research, automobile technology, computer entertainment and video game programs, control input devices, augmented reality glasses, and more. There are a number of techniques for eye tracking, also known as gaze tracking. Some of these techniques determine a user's gaze direction from the orientation of the pupils of the user's eyes. Some known eye gaze tracking techniques involve illuminating the eyes by emitting light from one or more light sources and detecting reflections of the emitted light off of the corneas with a sensor. Typically, this is accomplished using invisible light sources in the infrared range and capturing image data (e.g., images or video) of the illuminated eyes with an infrared sensitive camera. Image processing algorithms are then used to analyze the image data to determine eye gaze direction.

Generally, eye tracking image analysis takes advantage of characteristics distinctive to how light is reflected off of the eyes to determine eye gaze direction from the image. For example, the image may be analyzed to identify eye location based on corneal reflections in the image data, and the image may be further analyzed to determine gaze direction based on a relative location of the pupils in the image.

Two common gaze tracking techniques for determining eye gaze direction based on pupil location are known as Bright Pupil tracking and Dark Pupil tracking. Bright Pupil tracking involves illumination of the eyes with a light source that is substantially in line with the optical axis of the camera, causing the emitted light to be reflected off of the retina and back to the camera through the pupil. The pupil presents in the image as an identifiable bright spot at the location of the pupil, similar to the red eye effect which occurs in images during conventional flash photography. In this method of gaze tracking, the bright reflection from pupil itself helps the system locate the pupil if contrast between pupil and iris is not enough.

Dark Pupil tracking involves illumination with a light source that is substantially offline from the optical axis of the camera, causing light directed through the pupil to be reflected away from the optical axis of the camera, resulting in an identifiable dark spot in the image at the location of the pupil. In alternative Dark Pupil tracking systems, an infrared light source and cameras directed at eyes can look at corneal reflections. Such camera based systems track the location of the pupil and corneal reflections which provides parallax due to different depths of reflections gives additional accuracy.

Figure 5:
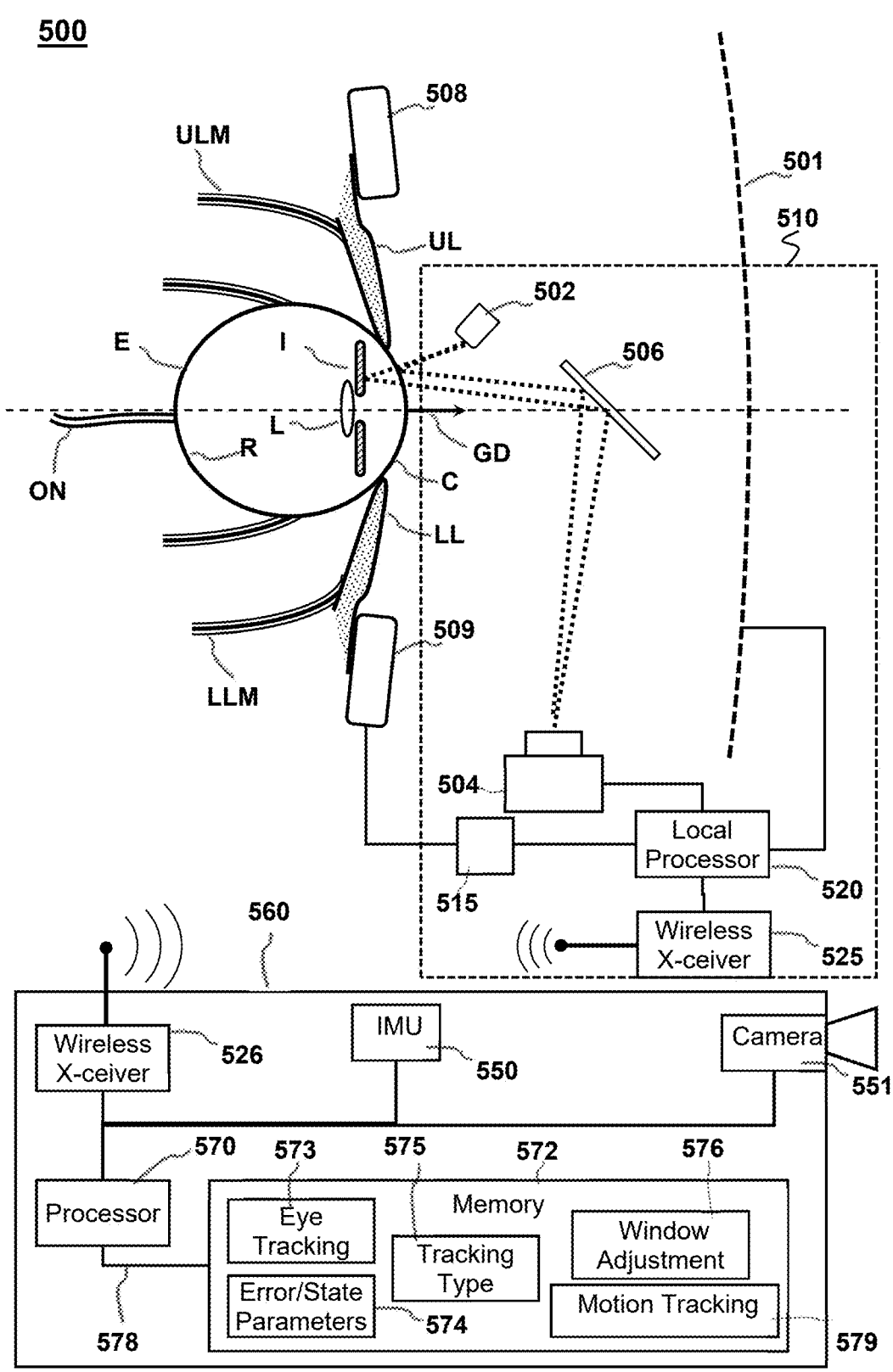
FIG. 5 depicts an example of a dark pupil gaze tracking system that may be used in the context of the present disclosure.

FIG. 5 depicts an example of a dark pupil gaze tracking system 500 that may be used in the context of the present disclosure. The gaze tracking system tracks the orientation of a user's eye E relative to a display screen 501 on which visible images are presented. While a display screen is utilized in the example system of FIG. 1A, certain alternative embodiments may utilize an image projection system capable of projecting images directly into the eyes of a user. In these embodiments, the user's eye E would be tracked relative to the images projected into the user's eyes. Alternatively, the display screen 501 may simply be a window through which the user views the surrounding environment. In the example depicted in FIG. 1A, the eye E gathers light from the screen 501 through a variable iris I and a lens L projects an image on the retina R. The opening in the iris is known as the pupil. Muscles control rotation of the eye E in response to nerve impulses from the brain. Upper and lower eyelid muscles ULM, LLM respectively control upper and lower eyelids UL, LL in response to other nerve impulses.

Light sensitive cells on the retina R generate electrical impulses that are sent to the user's brain (not shown) via the optic nerve ON. The visual cortex of the brain interprets the impulses. Not all portions of the retina R are equally sensitive to light. Specifically, light-sensitive cells are concentrated in an area known as the fovea.

The illustrated image tracking system includes an eye tracking system 510 having one or more infrared light sources 502, e.g., light emitting diodes (LEDs) that direct non-visible light (e.g., infrared light) toward the eye E. Part of the non-visible light reflects from the cornea C of the eye and part reflects from the iris. The reflected non-visible light is directed toward a suitable sensor 504 (e.g., an infrared camera) by a wavelength-selective mirror 506. The mirror transmits visible light from the screen 501 but reflects the non-visible light reflected from the eye.

The sensor 504 is preferably an image sensor, e.g., a digital camera that can produce an image of the eye E which may be analyzed to determine a gaze direction GD from the relative position of the pupil. This image may be produced with a local processor 520 or via the transmission of the obtained gaze tracking data to a remote computing device 560. The local processor 520 may be configured according to well-known architectures, such as, e.g., single-core, dual-core, quad-core, multi-core, processor-coprocessor, cell processor, and the like. The image tracking data may be transmitted between the sensor 504 and the remote computing device 560 via a wired connection (not shown), or wirelessly between a wireless transceiver 525 included in the eye tracking device 510 and a second wireless transceiver 526 included in the remote computing device 560. The wireless transceivers may be configured to implement a local area network (LAN) or personal area network (PAN), via a suitable network protocol, e.g., Bluetooth, for a PAN.

The gaze tracking system 500 may also include an upper sensor 508 and lower sensor 509 that are configured to be placed, for example, respectively above and below the eye E. Sensors 508 and 509 may be independent components, or may alternatively be part of the eye tracking device 510, which may be part of a component worn on the user's head that may include, but is not limited to, any combination of the sensor 504, local processor 520, or inertial sensor 515 described below. In the example system shown in FIG. 5A, sensors 508 and 509 are capable of collecting data regarding the electrical impulses of the nervous system and/or the movement and/or vibration of the muscular system from those areas surrounding the eye E. This data may include for example, electrophysiological and/or vibrational information of the muscles and/or nerves surrounding the eye E as monitored by the upper sensor 508 and lower sensor 509. The electrophysiological information collected by sensors 508 and 509 may include, for example, electroencephalography (EEG), electromyography (EMG), or evoked potential information collected as a result of nerve function in the area(s) surrounding the eye E. Sensors 508 and 509 may also be capable of collecting, for example, mechanomyogram or surface electromyogram information as a result of detecting the muscular vibrations or twitches of the muscles surrounding the eye E. The data collected by sensors 508 and 509 may be delivered with the image tracking data to the local processor 520 and/or the remote computing device 560 as described above.

The gaze tracking system 500 may also be capable of tracking a user's head. Head tracking may be performed by a head inertial sensor 515 capable of producing signals in response to the position, motion, orientation or change in orientation of the user's head. This data may be sent to the local processor 520 and/or transmitted to the remote computing device 560. The head inertial sensor 515 may be an independent component, or may alternatively be part of the eye tracking device 510, which may be worn on the user's head. The eye tracking device 510 may optionally include any combination of the sensor 504, local processor 520 or sensors 508 and 509 described above. In alternative embodiments, head tracking may be performed via the tracking of light sources on the component 510.

The remote computing device 560 may be configured to operate in coordination with the eye tracking device 510 and the display screen 501, in order to perform eye gaze tracking and determine lighting conditions in accordance with aspects of the present disclosure. The computing device 560 may include one or more processor units 570, which may be configured according to well-known architectures, such as, e.g., single-core, dual-core, quad-core, multi-core, processor-coprocessor, cell processor, and the like. The computing device 560 may also include one or more memory units 572 (e.g., random access memory (RAM), dynamic random access memory (DRAM), read-only memory (ROM), and the like). Additionally, the computing device may include an external view camera or light sensor 591 for optical motion tracking and an IMU 550 for inertial motion tracking.

The processor unit 570 may execute one or more programs, portions of which may be stored in the memory 572, and the processor 570 may be operatively coupled to the memory 572, e.g., by accessing the memory via a data bus 578. The programs may be configured to perform eye gaze tracking and determine lighting conditions for the system 500. By way of example, and not by way of limitation, the programs may include gaze tracking programs 573, the execution of which may cause the system 500 to track a user's gaze, e.g., as discussed above, error and state parameter determination programs 574, tracking type determination programs 175, inertial window adjustment programs 576, and motion tracking programs 579.

By way of example, and not by way of limitation, the gaze tracking programs 573 may include processor executable instructions which cause the system 500 to determine one or more gaze tracking parameters of the system 500 from eye tracking data gathered with the image sensor 504 and eye movement data gathered from the upper and lower sensors 508 and 509, respectively, while light is emitted from the lighting source 502. The gaze tracking programs 573 may also include instructions which analyze images gathered with the image sensor 504 in order to detect a presence of a change in lighting conditions.

Figure 6:
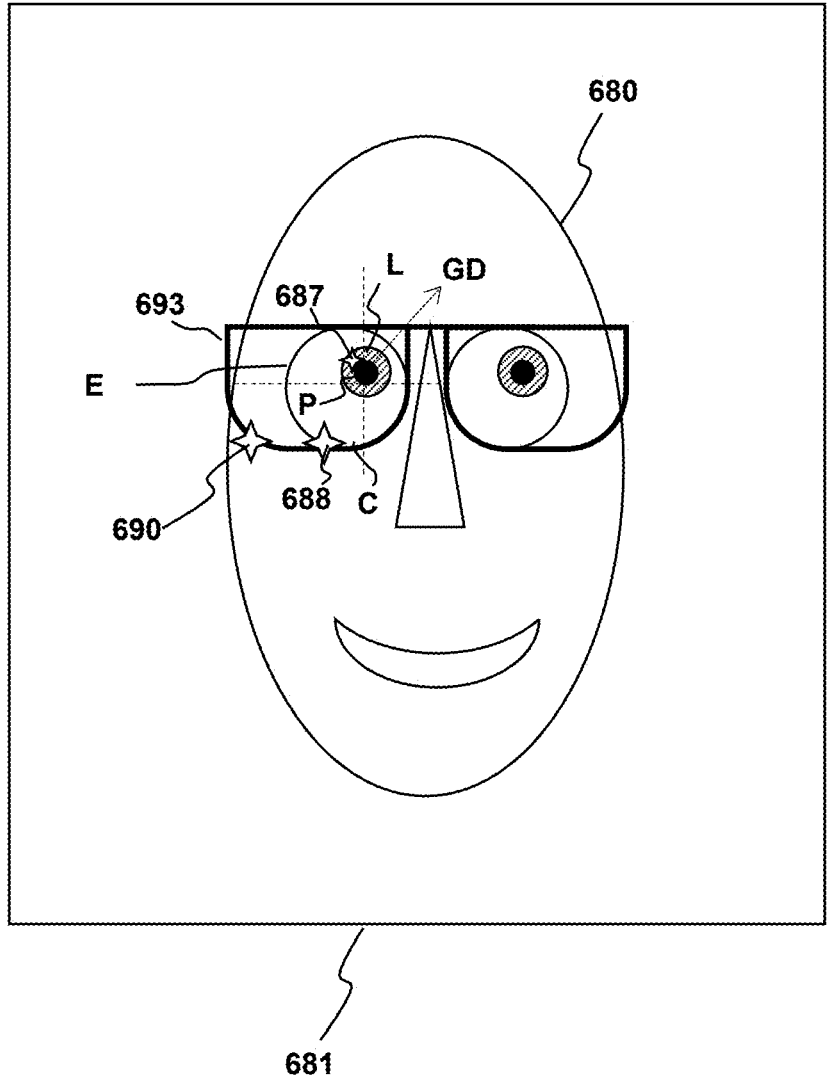
FIG. 6 is schematic diagrams illustrating gaze tracking within the context of aspects of the present disclosure.

As seen in FIG. 6, the image 681 showing a user's head H may be analyzed to determine a gaze direction GD from the relative position of the pupil. For example, image analysis may determine a 2-dimensional offset of the pupil P from a center of the eye E in the image. The location of the pupil relative to the center may be converted to a gaze direction relative to the screen 101, by a straightforward geometric computation of a three-dimensional vector based on the known size and shape of the eyeball. The determined gaze direction GD is capable of showing the rotation and acceleration of the eye E as it moves relative to the screen 501.

As also seen in FIG. 6, the image may also include reflections 687 and 688 of the non-visible light from the cornea C and the lens L, respectively. Since the cornea and lens are at different depths, the parallax and refractive index between the reflections may be used to provide additional accuracy in determining the gaze direction GD. An example of this type of eye tracking system is a dual Purkinje tracker, wherein the corneal reflection is the first Purkinje Image and the lens reflection is the 4th Purkinje Image. There may also be reflections 690 from a user's eyeglasses 693, if these are worn a user.

When a user blinks, visual information is shut off by the eyelids. When a user's eyes undergo a blink, the brain effectively shuts off interpretation of visual information. Human eyes also exhibit rapid eye movements known as saccades. A phenomenon known as saccadic masking occurs during a saccade. Saccadic masking causes the brain to suppress visual information during such rapid eye movements. Thus, during a blink or saccade the brain is not receiving visual information and interpolates between images seen before the saccade and after the saccade. Thus, a jump between tracking points generated between two different tracking systems may be masked by hiding the change in the saccade or blink because the brain will naturally interpolate between the different tracking points. This may create a change that is less noticeable to the user than if the device generated an interpolation between tracking points. Masking the jump may avoid jarring, disorienting, or inducing nausea in the user.

There is a relatively large variation in the duration of a saccade or blink. For example, a saccade typically lasts from 20 to 200 ms. This corresponds to between 2 and 24 frames at a frame rate of 120 frames per second (fps) for a display. Even if it takes 10 ms to detect the start of saccade and the saccade only lasts 20 ms, this is plenty of time for the tracking system to update tracking location. A blink typically lasts from about 100 ms to about 150 ms, which is a sufficient time for 12 to 18 frames at 120 fps. As such using blinks or saccades to mask changes in tracking type provides plenty of time to update the display and tracking information before the user can see the change.

As discussed with respect to FIG. 5, camera-based eye tracking can be augmented with other methods to update eye tracking during a blink phase. Examples of augmentation include providing EEG information in addition to the image information in order to detect nerve impulses that trigger eye muscle activity. This information can also be used help detect the start and end of blinks and saccades. Eye tracking systems can determine whether the vision system is in a saccade or not by high-pass filtering based on rate of eye movement.

Aspects of the present disclosure leverage detecting the onset of a saccade or a blink to time the change from a first tracking type to a second tracking time. According to aspects of the present disclosure a graphics tracking system can analyze information from fast and accurate eye tracking to change between tracking types during the user's saccades and/or blinks. Gaze tracking information may be analyzed to detect the onset of a saccade or blink and predict its duration. For example, the onset of a saccade may be correlated to rotational velocity and or acceleration of the eye. The onset of a blink may be correlated to movement of the eyelids as determined from analysis of images from the sensor 504 or electrophysiological information collected by sensors 508 and 509. By way of example, and not by way of limitation, the duration of a saccade can be estimated from measured rotational velocity of the eye obtained from gaze tracking and a known correlation between rotational velocity and saccade duration. For example, the duration of saccadic masking tends to increase with increasing rotational velocity of the eye at the onset of a saccade.

With knowledge that a blink or a saccade has begun and when it will end, tracking system could change tracking modes and resume tracking before the time a user's saccade or blink will finish. The result may be a tracking system that changes between tracking modes when the system loses confidence in one of the modes in a way that is less perceptible to the user. Furthermore, as the user uses the system over a period of time, software running on the computing device 560 can analyze gaze tracking data to improve detection and estimates of duration estimation and final gaze point for saccades or blinks.

Figures 7A, 7B, 7C, 7D, 7E, 7F, 7G, 7H:
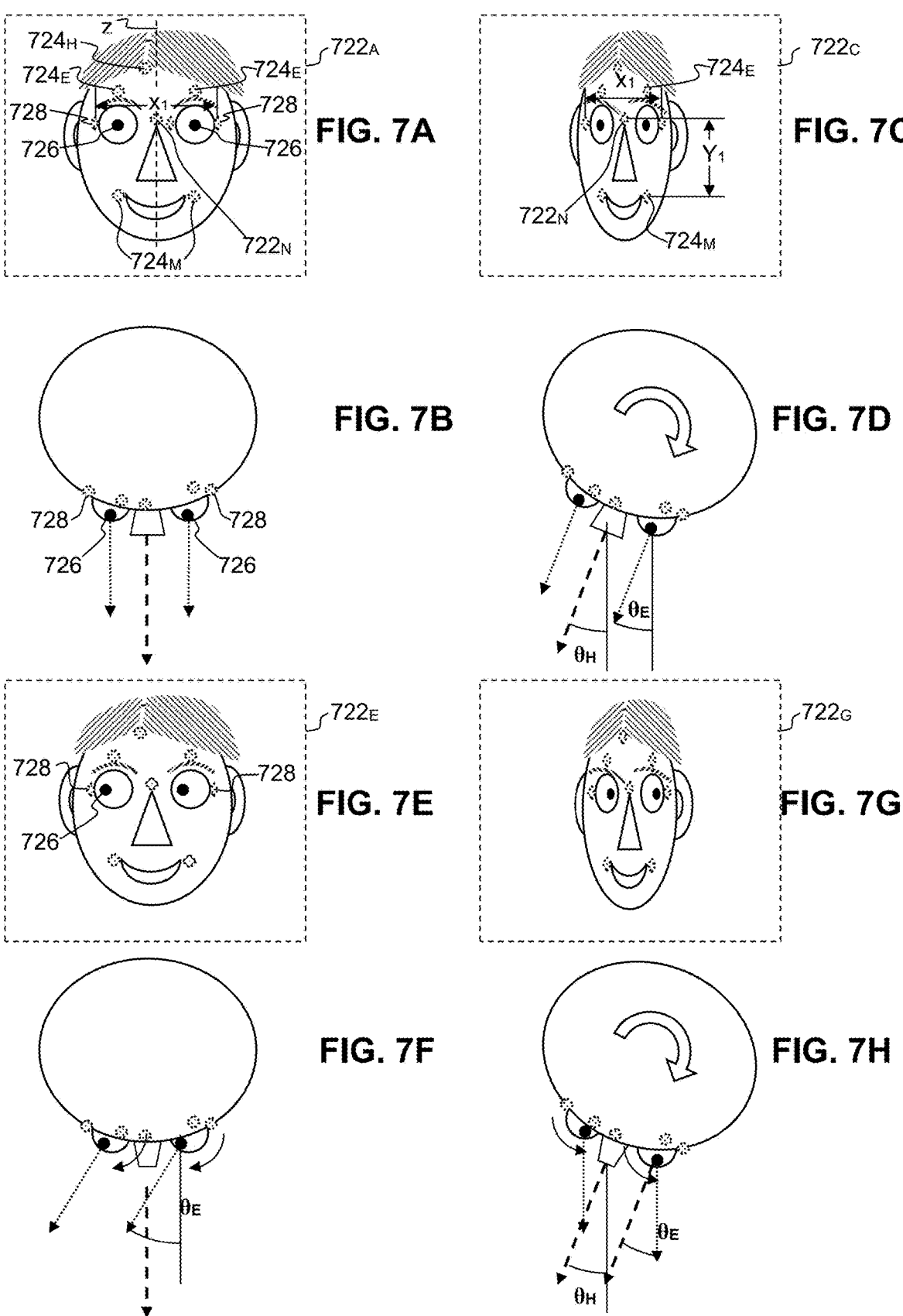
FIGS. 7A-7H illustrate examples of the use of facial orientation and eye gaze direction in conjunction with aspects of the present disclosure.

FIGS. 7A-7H illustrate examples of the use of facial orientation and eye gaze direction in conjunction with aspects of the present disclosure. As seen in FIG. 7A a face 720 of a user may appear in an image $722_A$ obtained with a camera trained on the user. Such cameras are common features of devices such as laptop computers, smart phones, and tablet computers. Image analysis software may identify reference points on the face 720. The software may characterize certain of these reference points, e.g., located at the corners of the mouth $724_M$, the bridge of the nose $724_N$, the part in the hair $724_H$, and at the tops of the eyebrows $724_E$, as being substantially fixed relative to the face 720. The software may also identify the pupils 726 and corners 728 of the user's eyes as reference points and determine the location of the pupils relative to the corners of the eyes. In some implementations, the centers of the user's eyes can be estimated from the locations of the pupils 726 and corners 728 of eyes. Then, the centers of eyes can be estimated and the locations of pupils can be compared with the estimated locations of the centers. In some implementations, face symmetry properties can be used.

The software can determine the user's facial characteristics, e.g., head tilt angle and eye gaze angle from analysis of the relative locations of the reference points and pupils 726. For example, the software may initialize the reference points $724_E$, $924_H$, $724_M$, $724_N$, 728 by having the user look straight at the camera and register the locations of the reference points and pupils 726 as initial values. The software can then initialize the head tilt and eye gaze angles to zero for these initial values. Subsequently, whenever the user looks straight ahead at the camera, as in FIG. 7A and the corresponding top view shown in FIG. 7B, the reference points $724_E$, $724_H$, $724_M$, $724_N$, 728 and pupils 726 should be at or near their initial values.

By way of example and not by way of limitation, the pose of a user's head may be estimated using five reference points, the outside corners 728 of each of the eyes, the outside corners $724_M$ of the mouth, and the tip of the nose (not shown). A facial symmetry axis may be found by connecting a line between a midpoint of the eyes (e.g., halfway between the eyes' outside corners 728) and a midpoint of the mouth (e.g., halfway between the mouth's outside corners $724_M$). A facial direction can be determined under weak-perspective geometry from a 3D angle of the nose. Alternatively, the same five points can be used to determine the head pose from the normal to the plane, which can be found from planar skew-symmetry and a coarse estimate of the nose position. Further details of estimation of head pose can be found, e.g., in "Head Pose Estimation in Computer Vision: A Survey" by Erik Murphy, in *IEEE TRANSACTIONS ON PATTERN ANALYSIS AND MACHINE INTELLIGENCE*, Vol. 31, No. 4, April 2009, pp 607-626, the contents of which are incorporated herein by reference. Other examples of head pose estimation that can be used in conjunction with embodiments of the present invention are described in "Facial feature extraction and pose determination," by Athanasios Nikolaidis *Pattern Recognition, Vol.* 33 (Jul. 7, 2000) pp. 1783-1791, the entire contents of which are incorporated herein by reference. Additional examples of head pose estimation that can be used in conjunction with embodiments of the present invention are described in "An Algorithm for Real-time Stereo Vision Implementation of Head Pose and Gaze Direction Measurement", by Yoshio Matsumoto and Alexander Zelinsky in *FG '00 Proceedings of the Fourth IEEE International Conference on Automatic Face and Gesture Recognition,* 2000, pp 499-505, the entire contents of which are incorporated herein by reference. Further examples of head pose estimation that can be used in conjunction with embodiments of the present invention are described in "3D Face Pose Estimation from a Monocular Camera" by Qiang Ji and Ruong Hu in *Image and Vision Computing*, Vol. 20, Issue 7, 20 Feb. 2002, pp 499-511, the entire contents of which are incorporated herein by reference.

When the user tilts his head, the relative distances between the reference points in the image may change depending upon the tilt angle. For example, if the user pivots his head to the right or left, about a vertical axis Z the horizontal distance $x_1$ between the corners 728 of the eyes may decrease, as shown in the image 722$_C$. Other reference points may also work, or be easier to detect, depending on the particular head pose estimation algorithm being used. The amount change in the distance can be correlated to an angle of pivot $\theta_H$ as shown in the corresponding top view in FIG. 1E. It is noted that if the pivot is purely about the Z axis the vertical distance $Y_1$ between, say, the reference point at the bridge of the nose 724$_N$ and the reference points at the corners of the mouth 724$_M$, would not be expected to change significantly. However, it would be reasonably expected for this distance $y_1$ to change if the user were to tilt his head upwards or downwards. It is further noted that the software may take the head pivot angle $\theta_H$ into account when determining the locations of the pupils 726 relative to the corners 728 of the eyes for gaze direction estimation. Alternatively the software may take the locations of the pupils 726 relative to the corners 728 of the eyes into account when determining head pivot angle $\theta_H$. Such an implementation might be advantageous if gaze prediction is easier, e.g., with an infrared light source on a hand-held device, the pupils could be located relatively easily. In the example, shown in FIG. 7C and FIG. 7D, the user's eye gaze angle $\theta_E$ is more or less aligned with the user's head tilt angle. However, because of the pivoting of the user's head and the three-dimensional nature of the shape of the eyeballs, the positions of the pupils 726 will appear slightly shifted in the image 722$_D$ compared to their positions in the initial image 722$_A$.

In some situations, the user may be facing the camera, but the user's eye gaze is directed elsewhere, e.g., as shown in FIG. 7E and the corresponding top view in FIG. 7F. In this example, the user's head is tilt angle $\theta_H$ is zero but the eye gaze angle $\theta_E$ is not. Instead, the user's eyeballs are rotated counterclockwise, as seen in FIG. 7F. Consequently, the reference points 724$_E$, 724$_H$, 724$_M$, 724$_N$, 728 are arranged as in FIG. 7A, but the pupils 726 are shifted to the left in the image 722$_E$.

It is noted that the user's head may pivot in one direction and the user's eyeballs may pivot in another direction. For example, as illustrated in FIG. 7H and FIG. 7I, the user 701 may pivot his head clockwise and rotate his eyeballs counterclockwise. Consequently, the reference points 724$_E$, 724$_H$, 724$_M$, 724$_N$, 728 are shifted as in FIG. 7D, but the pupils 726 are shifted to the right in the image 722G shown in FIG. 7G. The gaze tracking system 500, as described above with respect to FIGS. 5-6, may take this configuration or any of the configurations described above into account in determining the gaze direction GD of the user's eye E.

As may be seen from the foregoing discussion it is possible to track certain user facial orientation characteristics using just a camera. Thus, according to aspects of the present disclosure, changing between motion tracking modes during a saccade or blink may not be tied to a particular implementation of head mounted display but may be used with any system that includes a camera.

Figure 8:
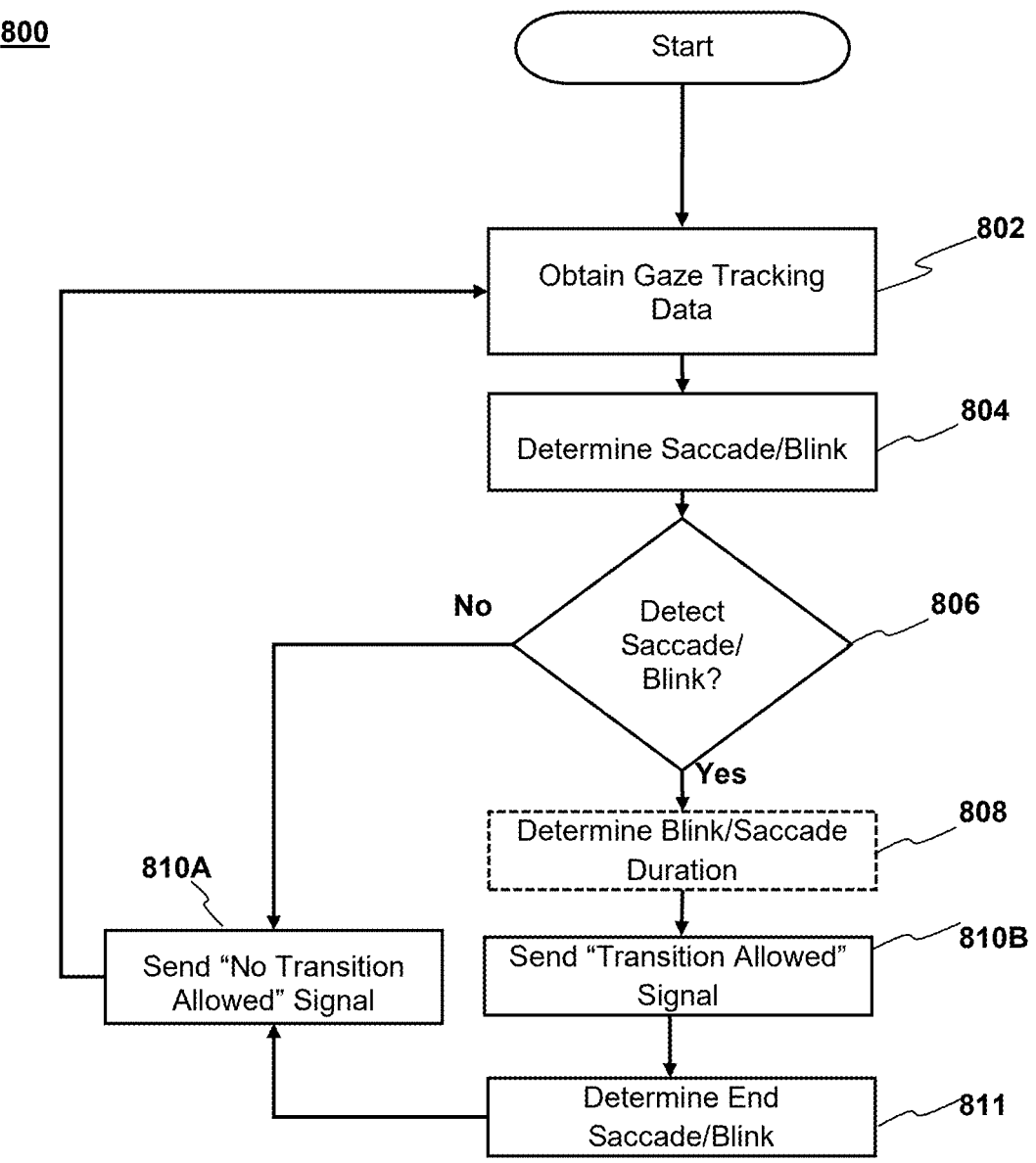
FIG. 8 shows an example eye tracking method which may be used in conjunction with motion tracking to change motion tracking modes during the saccades and/or blinks by a viewer.

FIG. 8 shows an example of an eye tracking saccade or blink detection method 800 which may be used in conjunction with motion tracking to change motion tracking modes during the saccades and/or blinks by a viewer. In this example, gaze tracking data 802 may be obtained as discussed with respect to FIGS. 5-6 and 7A-7F. The gaze tracking data may then be analyzed to detect the onset of a saccade and/or blink, as indicated at 804. If, at 806 no saccade or blink is detected no signal may be sent to the motion tracking system or a no-transition signal may be sent at 810A followed by the tracking system remaining in whatever mode it is currently in. If instead, a saccade and/or blink is detected at 806 the system may determine or estimate the duration of the saccade/blink at 808 and send a "transition allowed" signal at 810B that accounts for the duration and nature of the saccade/blink. Alternatively, in some implementations the duration of the saccade or blink may not be determined or estimated. The system may monitor the user for the end to the saccade/blink or time duration of the saccade/blink at 811 and the system may send no-transition signal 810A when the saccade or blink ends, thus, cycling back to monitoring gaze data at 802. In some alternative implementations the gaze tracking system may not monitor the user for the end to the saccade/blink or time duration of the saccade/blink and instead may simply return to obtaining gaze tracking data at 802 after sending the transition allowed signal, relying instead on the determined or estimated duration of the saccade/blink. In this way a gaze tracker may be configured for use with motion tracking to allow transition between tracking modes during a saccade/blink.

General Neural Network Training

According to aspects of the present disclosure, the tracking system may use machine learning with neural networks (NN). For example, trained models may be used to determine confidence level and/or orientation from inertial data as discussed above and may use machine learning methods as discussed below. In some implementations the machine learning algorithm for confidence level determination may use a training data set, which may include inputs from optical tracking such as tracked features/landmarks, optical tracking positions, optical tracking mappings, masked confidence levels and inertial inputs, such as one or more axes acceleration information, inertial tracking sequences as well as known positions and orientations and masked confidence levels as ground truth training. During training, the model may be tasked with predicting the masked confidence levels based on the input data. For Inertial tracking, the machine learning algorithm may include one or more inertial inputs and 6 degrees of freedom (6DOF) positions and/or orientations as ground truth training. During training, the model here may be tasked with predicting positions and/or orientations based on the inputs. In some implementations a machine learning algorithm may be trained to perform simultaneous localization and mapping (SLAM) with a training set with objects such as the ground, landmarks, and body parts with hidden labelings. The hidden labeling may include the identity of the objects and their relative location. As is generally understood by those skilled in the art, SLAM techniques general solve the problem of constructing or updating a map of an unknown environment while simultaneously keeping track of an agent's location within it.

The NNs may include one or more of several different types of neural networks and may have many different layers. By way of example and not by way of limitation the neural network may consist of one or multiple convolutional neural networks (CNN), recurrent neural networks (RNN) and/or dynamic neural networks (DNN). The Motion Decision Neural Network may be trained using the general training method disclosed herein.

Figures 10A, 10B, 10C:
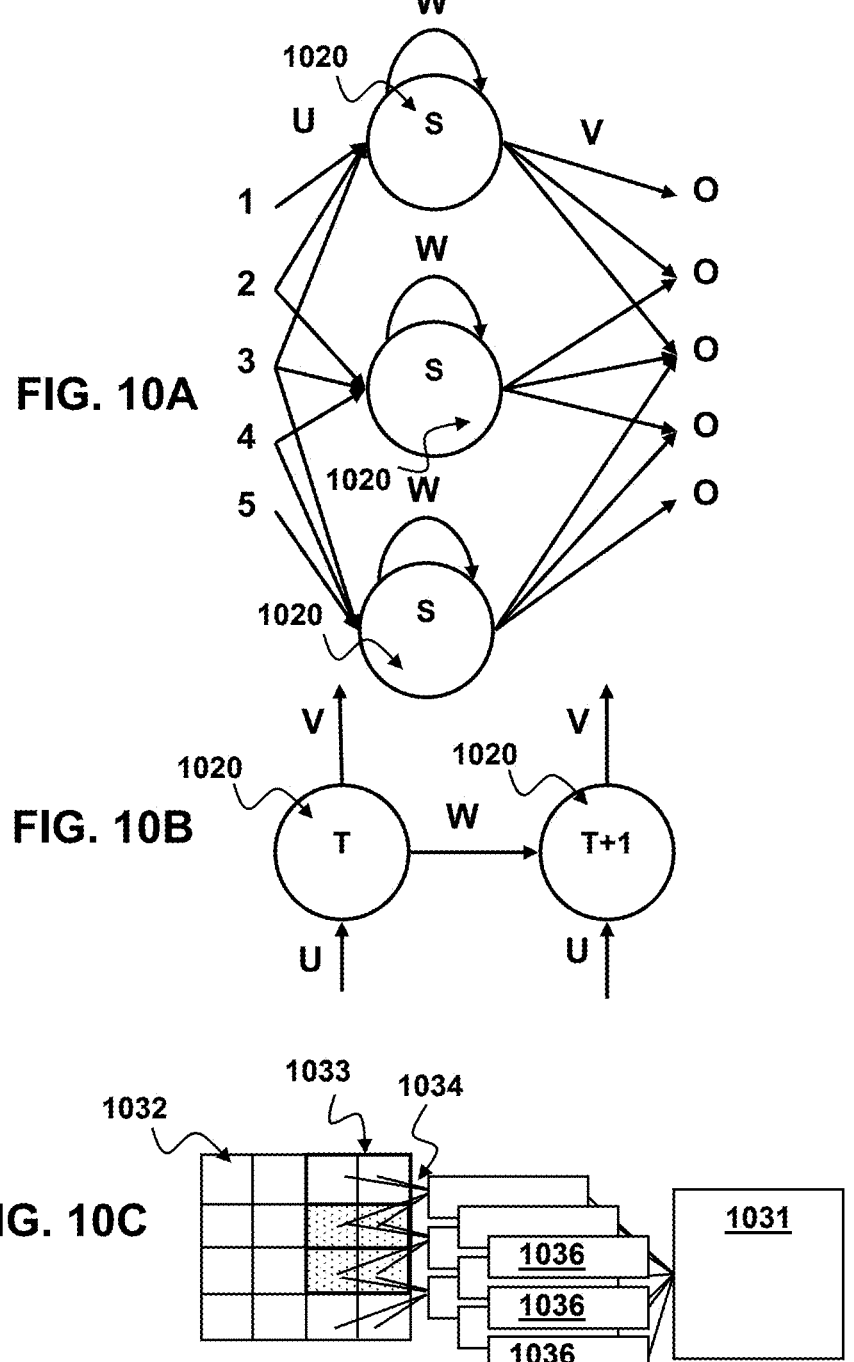
FIG. 10A is a diagram depicting the basic form of an RNN having a layer of nodes, each of which is characterized by an activation function, one input weight, a recurrent hidden node transition weight, and an output transition weight according to aspects of the present disclosure.
FIG. 10B, is a simplified diagram showing that the RNN may be considered a series of nodes having the same activation function moving through time according to aspects of the present disclosure.
FIG. 10C depicts an example layout of a convolution neural network such as a CRNN according to aspects of the present disclosure.

By way of example, and not limitation, FIG. 10A depicts the basic form of an RNN that may be used, e.g., in the trained model. In the illustrated example, the RNN has a layer of nodes 1020, each of which is characterized by an activation function S, one input weight U, a recurrent hidden node transition weight W, and an output transition weight V. The activation function S may be any non-linear function known in the art and is not limited to the (hyperbolic tangent (tanh) function. For example, the activation function S may be a Sigmoid or ReLu function. Unlike other types of neural networks, RNNs have one set of activation functions and weights for the entire layer. As shown in FIG. 10B, the RNN may be considered as a series of nodes 1020 having the same activation function moving through time T and T+1. Thus, the RNN maintains historical information by feeding the result from a previous time T to a current time T+1.

In some implementations, a convolutional RNN may be used. Another type of RNN that may be used is a Long Short-Term Memory (LSTM) Neural Network which adds a memory block in a RNN node with input gate activation function, output gate activation function and forget gate activation function resulting in a gating memory that allows the network to retain some information for a longer period of time as described by Hochreiter & Schmidhuber "Long Short-term memory" Neural Computation 9(8):1735-1780 (1997), which is incorporated herein by reference.

FIG. 10C depicts an example layout of a convolution neural network such as a CRNN, which may be used, e.g., in the trained model according to aspects of the present disclosure. In this depiction, the convolution neural network is generated for an input 1032 with a size of 4 units in height and 4 units in width giving a total area of 16 units. The depicted convolutional neural network has a filter 1033 size of 2 units in height and 2 units in width with a skip value of 1 and a channel 136 of size 9. For clarity in FIG. 10C only the connections 1034 between the first column of channels and their filter windows are depicted. Aspects of the present disclosure, however, are not limited to such implementations. According to aspects of the present disclosure, the convolutional neural network may have any number of additional neural network node layers 1031 and may include such layer types as additional convolutional layers, fully connected layers, pooling layers, max pooling layers, local contrast normalization layers, etc. of any size.

Figure 10D:
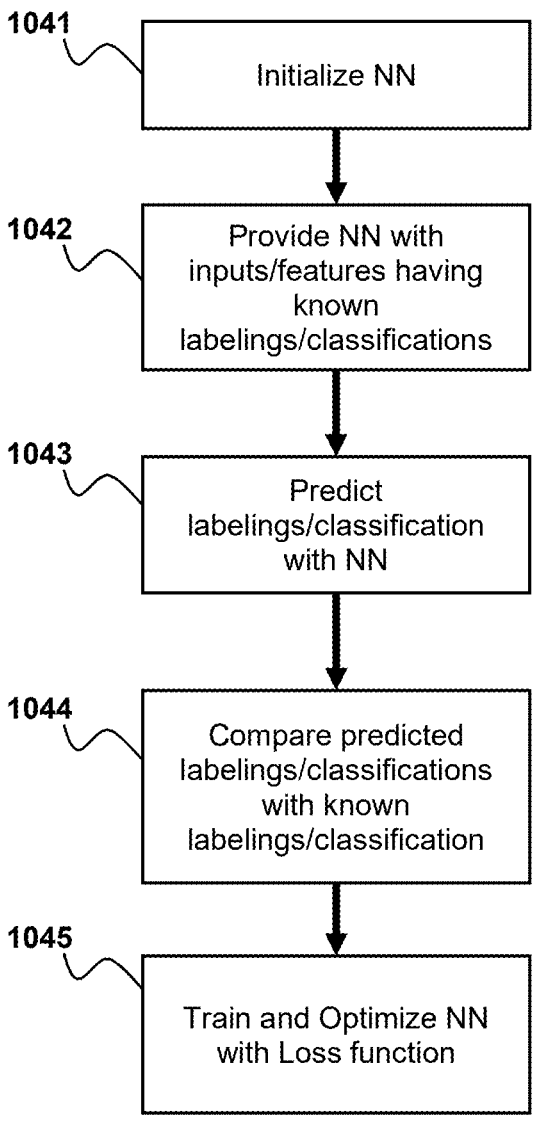
FIG. 10D shows a flow diagram depicting a method for supervised training of a machine learning neural network according to aspects of the present disclosure.

As seen in FIG. 10D Training a neural network (NN) begins with initialization of the weights of the NN at 1041. In general, the initial weights should be distributed randomly. For example, an NN with a tanh activation function should have random values distributed between $$-\frac{1}{\sqrt{n}} \text{ and } \frac{1}{\sqrt{n}}$$

where n is the number of inputs to the node.

After initialization, the activation function and optimizer are defined. The NN is then provided with a feature vector or input dataset at 1042. Each of the different feature vectors may be generated by the NN from inputs that have known labels. Similarly, the NN may be provided with feature vectors that correspond to inputs having known labeling or classification. The NN then predicts a label or classification for the feature or input at 1043. The predicted label or class is compared to the known label or class (also known as ground truth) and a loss function measures the total error between the predictions and ground truth over all the training samples at 1044. By way of example and not by way of limitation the loss function may be a cross entropy loss function, quadratic cost, triplet contrastive function, exponential cost, etc. Multiple different loss functions may be used depending on the purpose. By way of example and not by way of limitation, for training classifiers a cross entropy loss function may be used whereas for learning pre-trained embedding a triplet contrastive function may be employed. The NN is then optimized and trained, using the result of the loss function, and using known methods of training for neural networks such as backpropagation with adaptive gradient descent etc., as indicated at 1045. In each training epoch, the optimizer tries to choose the model parameters (i.e., weights) that minimize the training loss function (i.e., total error). Data is partitioned into training, validation, and test samples.

During training, the Optimizer minimizes the loss function on the training samples. After each training epoch, the model is evaluated on the validation sample by computing the validation loss and accuracy. If there is no significant change, training can be stopped, and the resulting trained model may be used to predict the labels of the test data.

Thus, the neural network may be trained from inputs having known labels or classifications to identify and classify those inputs. Similarly, a NN may be trained using the described method to generate a feature vector from inputs having a known label or classification. While the above discussion is related to RNNs and CRNNS the discussions may be applied to NNs that do not include Recurrent or hidden layers.

System

Figure 11:
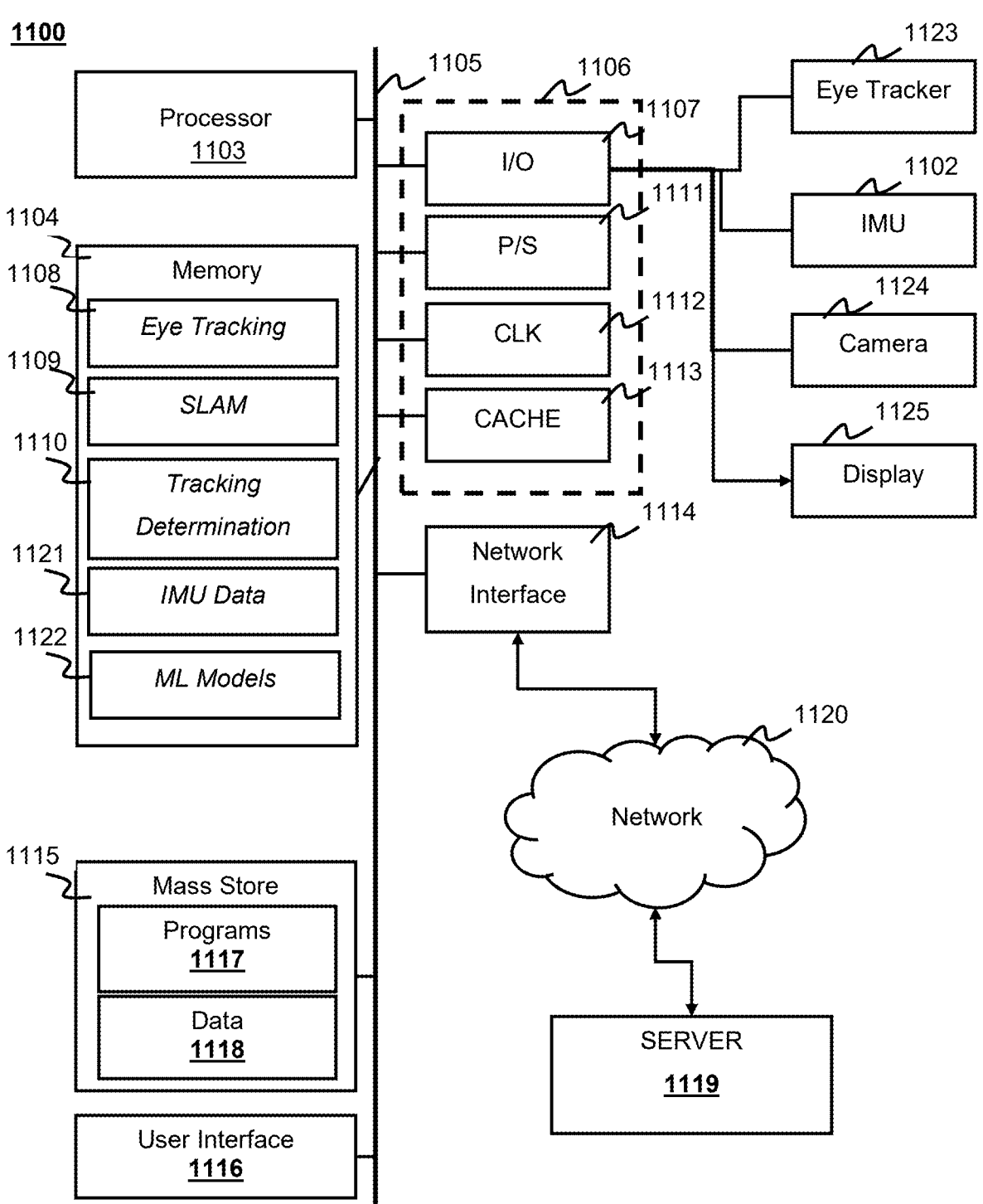
FIG. 11 is a block system diagram for a system for switching tracking modes during a blink or saccade according to aspects of the present disclosure.

FIG. 11 is a block system diagram for a system for switching tracking modes during a blink or saccade according to aspects of the present disclosure. By way of example, and not by way of limitation, according to aspects of the present disclosure, the system 1100 may be an embedded system, mobile phone, personal computer, tablet computer, portable game device, workstation, game console, and the like.

The system 1100 generally includes a central processor unit (CPU) 1103, and a memory 1104. The system 1100 may also include well-known support functions 1106, which may communicate with other components of the system, e.g., via a data bus 1105. Such support functions may include, but are not limited to, input/output (I/O) elements 1107, power supplies (P/S) 1111, a clock (CLK) 1112 and cache 1113.

The system 1100 may include a display device 1125 to present rendered graphics to a user. In alternative implementations, the display device is a separate component that works in conjunction with the system, 1100. The display device may be in the form of a flat panel display, head mounted display (HMD), cathode ray tube (CRT) screen, projector, or other device that can display visible text, numerals, graphical symbols, or images.

In some implementations, the display device 1125 may be coupled with a camera 1124 and a controller 1116 which includes two or more light sources and the IMU 1102 to carry out controller tracking using any of the configurations described herein. In alternative implementations, the camera 1124 and the IMU 1102 may be coupled to the controller and the display device may include two or more light sources instead. In yet other alternative implementations, the Camera 1124 may be a separate unit uncoupled from the display device or the controller, the controller and display device in this case may both include two or more light sources for tracking. The term camera used herein should not be construed as limited to devices configured to capture visual images and may include any array of light sensitive elements configured to transduce information about the surrounding environment into corresponding electrical signals, which a processor, e.g., CPU 1103, may convert to image data.

In some implementations, e.g., where the display device is part of a head-mounted display (HMD), such HMD may include an eye tracking device 1123, which may have features in common with the eye tracking device 510 described above with respect to FIG. 5. The HMD may also include one or more additional head tracking IMU 1102, such as an accelerometer or gyroscope. As also discussed hereinabove, such an HMD may include light sources that may be tracked using a camera that is separate from the display device 1125 and coupled to the CPU 1913. By way of example, a separate camera 1024 may be mounted to the controller 1116.

In some implementations, the camera 1124 may be a hybrid sensor. Such a hybrid sensor may include a depth sensor, e.g., a DTOF sensor, in which case the hybrid sensor may include an illumination unit.

In some implementations eye tracker 1123 may be a wearable eye tracker such as a headset worn by the user separate from the display device. Alternatively, the eye tracker 1123 may be a standalone eye tracking unit placed in a location in view of the user's eyes. In yet other alternative implementations, the eye tracker may be integrated into other devices. For example and without limitation, the eye tracker may be implemented using a smartphone in which case the eye tracker would be integrated into the smartphone with either special hardware or using the generally equipped cameras and lights of the smartphone.

The system 1100 includes a mass storage device 1115 such as a disk drive, CD-ROM drive, flash memory, solid state drive (SSD), tape drive, or the like to provide non-volatile storage for programs and/or data. The system 1100 may also optionally include a user interface unit 1116 to facilitate interaction between the system 1100 and a user. The user interface 1116 may include a controller (e.g., game controller), a keyboard, mouse, joystick, light pen, or other device that may be used in conjunction with a graphical user interface (GUI). The system 1100 may also include a network interface 1114 to enable the device to communicate with other devices and/or servers 1119 over a network 1120. The network 1120 may be, e.g., a local area network (LAN), a wide area network such as the internet, a personal area network, such as a Bluetooth network or other type of network. These components may be implemented in hardware, software, or firmware, or some combination of two or more of these.

The CPU 1103 may each include one or more processor cores, e.g., a single core, two cores, four cores, eight cores, or more. In some implementations, the CPU 1103 may include a GPU core or multiple cores of the same Accelerated Processing Unit (APU). The memory 1104 may be in the form of an integrated circuit that provides addressable memory, e.g., random access memory (RAM), dynamic random-access memory (DRAM), synchronous dynamic random access memory (SDRAM), and the like. The main memory 1104 may include SLAM data and programs 1109 used by the processor 1103 to generate position and orientation information using information from the camera 1124. The main memory 1104 may include eye tracking data and programs 1108 used by the processor 1103 to determine the focus of the user's eyes and when the user has a blink or saccade. The main memory 1104 may also include IMU data 1124 received from the IMUs 1102 and used by the processor to determine accelerations and positions and orientations. A tracking determination program 1110 may also be stored in the main memory 1104 and implement methods for switching between tracking types and refinement of the inertial data window as discussed with FIGS. 1 and 2. Trained machine learning (ML) models 1122 such Neural Networks (NN) may be loaded into Memory 1104 for determination of position and orientation data and/or confidence level as discussed in FIG. 2. Additionally, the Memory 1104 may include machine learning algorithms with the ML model 1122 for training or adjusting the model.

According to aspects of the present disclosure, the processor may generate one or more orientations and configuration of the controller, headset, user's body or appendages, the ground, a landmark, or a separate as a result of carrying out the methods described in FIGS. 1 and 2. These positions and orientations may be held in the memory as part of SLAM 1109 and/or IMU data 1121 and may be used in successive iteration of the methods of FIGS. 1 and 2 to adjust the inertial measurement window. In some implementations, the processor 1103 may utilize such positions and/or orientations with the machine learning models 1122 trained to perform simultaneous localization and mapping (SLAM), and/or determine a confidence level in the SLAM data and/or determine position and orientation information from inertial information. Additionally, positions and/or orientations may be used iteratively with machine learning algorithms as discussed in FIG. 10D to train machine learning models.

The Mass Storage 1115 may contain Application or Programs 1117 that are loaded to the main memory 1104 when processing begins on the tracking determination 1110. Additionally, the mass storage 1115 may contain data 1118 used by the processor during processing of, eye tracking (e.g., error parameters) 1108, SLAM 1109, IMU data 1121, and ML Models 1122.

As used herein and as is generally understood by those skilled in the art, an application-specific integrated circuit (ASIC) is an integrated circuit customized for a particular use, rather than intended for general-purpose use.

As used herein and as is generally understood by those skilled in the art, a Field Programmable Gate Array (FPGA) is an integrated circuit designed to be configured by a customer or a designer after manufacturing—hence "field-programmable". The FPGA configuration is generally specified using a hardware description language (HDL), similar to that used for an ASIC.

As used herein and as is generally understood by those skilled in the art, a system on a chip or system on chip (SoC or SOC) is an integrated circuit (IC) that integrates all components of a computer or other electronic system into a single chip. It may contain digital, analog, mixed-signal, and often radio-frequency functions—all on a single chip substrate. A typical application is in the area of embedded systems.

A typical SoC includes the following hardware components:

One or more processor cores (e.g., microcontroller, microprocessor, or digital signal processor (DSP) cores.

Memory blocks, e.g., read only memory (ROM), random access memory (RAM), electrically erasable programmable read-only memory (EEPROM) and flash memory.

Timing sources, such as oscillators or phase-locked loops.

Peripherals, such as counter-timers, real-time timers, or power-on reset generators.

External interfaces, e.g., industry standards such as universal serial bus (USB), Fire Wire, Ethernet, universal asynchronous receiver/transmitter (USART), serial peripheral interface (SPI) bus.

Analog interfaces including analog to digital converters (ADCs) and digital to analog converters (DACs).

Voltage regulators and power management circuits.

These components are connected by either a proprietary or industry-standard bus. Direct Memory Access (DMA) controllers route data directly between external interfaces and memory, bypassing the processor core and thereby increasing the data throughput of the SoC.

A typical SoC includes both the hardware components described above, and executable instructions (e.g., software or firmware) that controls the processor core(s), peripherals, and interfaces.

Aspects of the present disclosure provide for improved redundancy and robustness of motion tracking using multiple tracking methods. Additionally, the present disclosure provides for switching between tracking modes in a way that may be imperceptible to the user. Thus, aspects of the present disclosure may enhance the user's experience with motion tracking by providing a robust tracking platform that changes tracking modes in way that may be imperceptible to the user unlike previous methods which may display rubber banding behavior to the user when there is a change or error in tracking. Furthermore, aspects of the present disclosure may be useful in situations in which a tracking system is subject to failure and it is desirable to mitigate discrepancies when tracking returns to normal.

While the above is a complete description of the preferred embodiment of the present invention, it is possible to use various alternatives, modifications, and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A," or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for switching between motion tracking modes, comprising:

detecting a significant change in confidence level for motion tracking;

initiating a change from a first tracking mode to a second tracking mode when the significant change in confidence level is detected; and pausing the change from the first tracking mode to the second tracking mode until a saccade or a blink is detected by an eye tracking device.

2. The method of claim 1 further comprising changing from the first tracking mode to the second tracking mode in response to a signal from an eye tracking device indicating the saccade or the blink.

3. The method of claim 1 wherein the significant change in confidence level includes a number of tracked landmarks and/or features in simultaneous localization and mapping reducing to below a threshold for tracked landmarks and/or features.

4. The method of claim 1 wherein the significant change in confidence level includes a large negative derivative value for a number of landmarks and/or features in simultaneous localization and mapping.

5. The method of claim 1 wherein the significant change in confidence level includes an increase in reprojection errors to above a reprojection error threshold.

6. The method of claim 1 wherein the first tracking mode is a simultaneous localization and mapping scheme and the second tracking mode an inertial based movement tracking scheme.

7. The method of claim 1 wherein the first tracking mode is an inertial based movement tracking scheme, and the second tracking mode is a simultaneous localization and mapping scheme.

8. The method of claim 7 wherein the significant change in confidence level includes a number of tracked landmarks and/or features in simultaneous localization and mapping increase to above a threshold for tracked landmarks and/or features.

9. The method of claim 7 wherein the significant change in confidence level includes sustained small derivative values for a number of landmarks and/or features in simultaneous localization and mapping.

10. The method of claim 7 wherein the significant change in confidence level includes a decrease in reprojection errors to below a reprojection error threshold.

11. The method of claim 7 further comprising adjusting a measurement window for the inertial based tracking scheme using acceleration information from the simultaneous localization and mapping scheme after changing the simultaneous localization and mapping scheme tracking mode.

12. The method of claim 11, wherein adjusting the window for the inertial based tracking scheme includes shrinking the measurement window when the simultaneous localization and mapping scheme tracking mode detects an increase in speed.

13. The method of claim 11 wherein adjusting the window for the inertial based tracking scheme includes expanding the measurement window when the simultaneous localization and mapping scheme tracking mode detects a decrease in speed.

14. The method of claim 1 wherein the detecting a significant change in confidence level for motion tracking includes using machine learning model trained to detect a change in accuracy of simultaneous localization and mapping data from optical tracking data.

15. The method of claim 1 wherein either the first tracking mode or the second tracking mode is an inertial measurement tracking scheme and wherein the inertial based movement tracking scheme includes an inertial measurement machine learning model trained to predict six degrees of freedom data from inertial data and correct drift.

16. A system for switching between motion tracking modes comprising:

a processor;

a memory communicatively coupled to the processor;

instructions embodied in the memory that when executed by the processor cause the processor to carry out one or more steps for switching between motion tracking modes comprising:

detecting a significant change in confidence level for motion tracking;

initiating a change from a first tracking mode to a second tracking mode when a significant change in confidence level is detected; and pausing the change from the first tracking mode to a second tracking mode until a saccade or a blink is detected by an eye tracking device.

17. The system of claim 16 further comprising an eye tracking device.

18. The system of claim 17 wherein the eye tracking devices is part of a head mounted display.

19. The system of claim 17, wherein the one or more steps for switching between motion tracking modes further comprises changing from the first tracking mode to the second tracking mode in response to a signal from the eye tracking device indicating the saccade or the blink.

20. The system of claim 16 further comprising one or more cameras and wherein either the first tracking mode or the second tracking mode is a simultaneous localization and mapping scheme.

21. The system of claim 16 further comprising one or more inertial measurement units and wherein either the first tracking mode or the second tracking mode is an inertial movement tracking scheme.

22. A non-transitory computer readable medium having instruction embodied therein that when executed by a computer cause the computer to carry out a method for switching between motion tracking mode comprising:

detecting a significant change in confidence level for motion tracking;

initiating a change from a first tracking mode to a second tracking mode when a significant change in confidence level is detected; and pausing the change from the first tracking mode to a second tracking mode until a saccade or a blink is detected.

\* \* \* \* \*